Aug. 28, 1962     LE ROY J. LANGE     3,051,384
TOTALISATOR SYSTEM

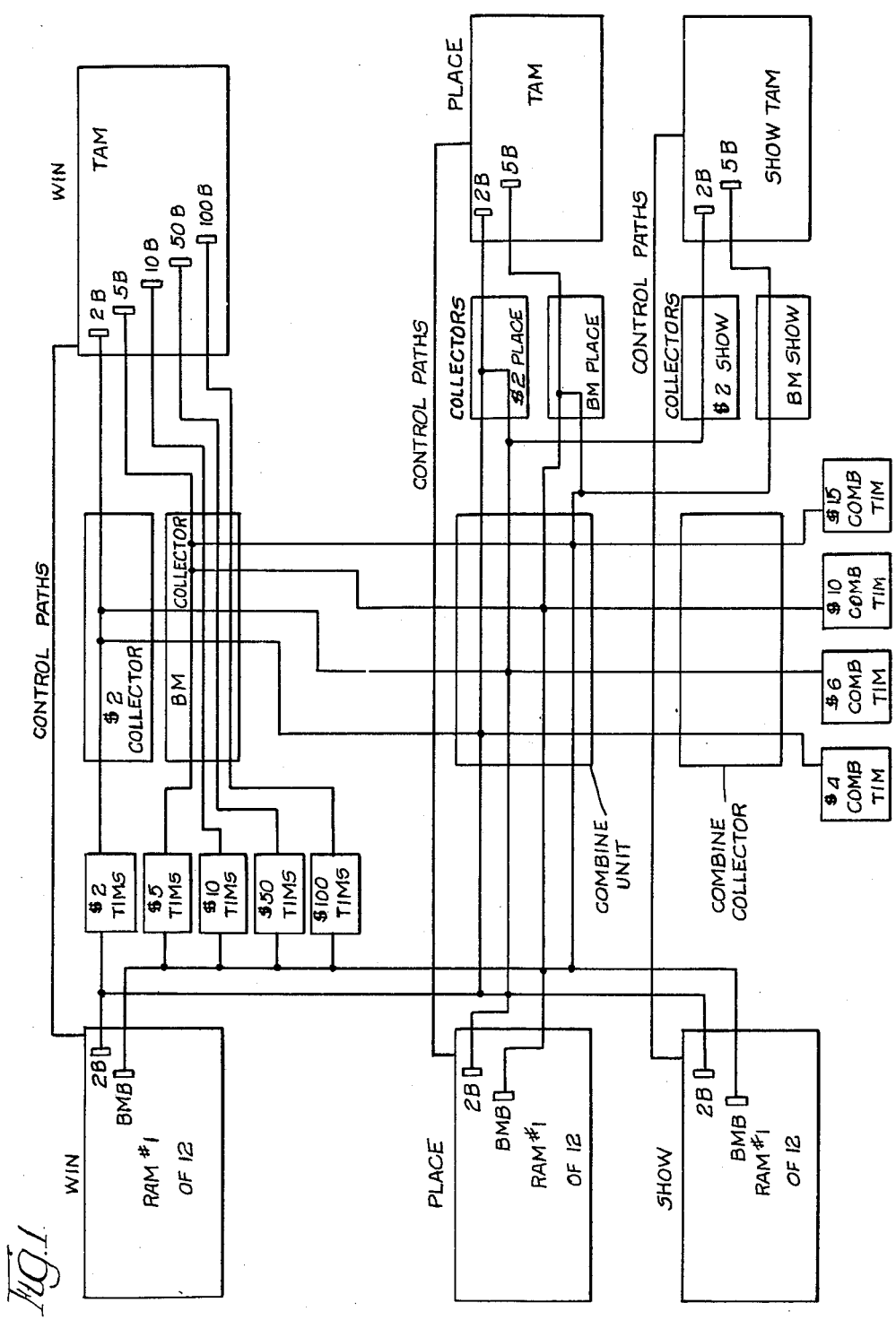

Filed Oct. 9, 1959     14 Sheets-Sheet 2

Aug. 28, 1962 LE ROY J. LANGE 3,051,384
TOTALISATOR SYSTEM
Filed Oct. 9, 1959 14 Sheets-Sheet 3
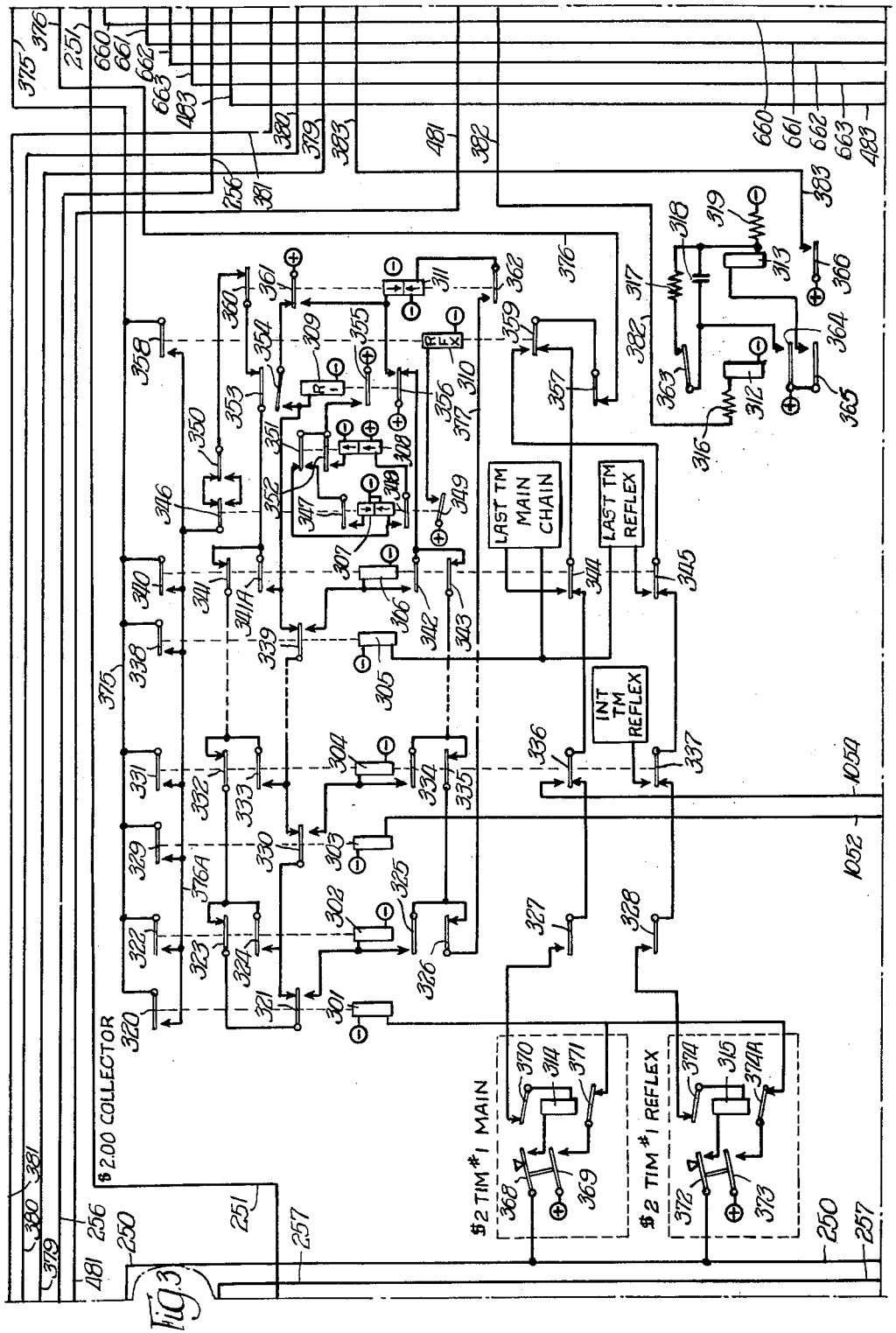

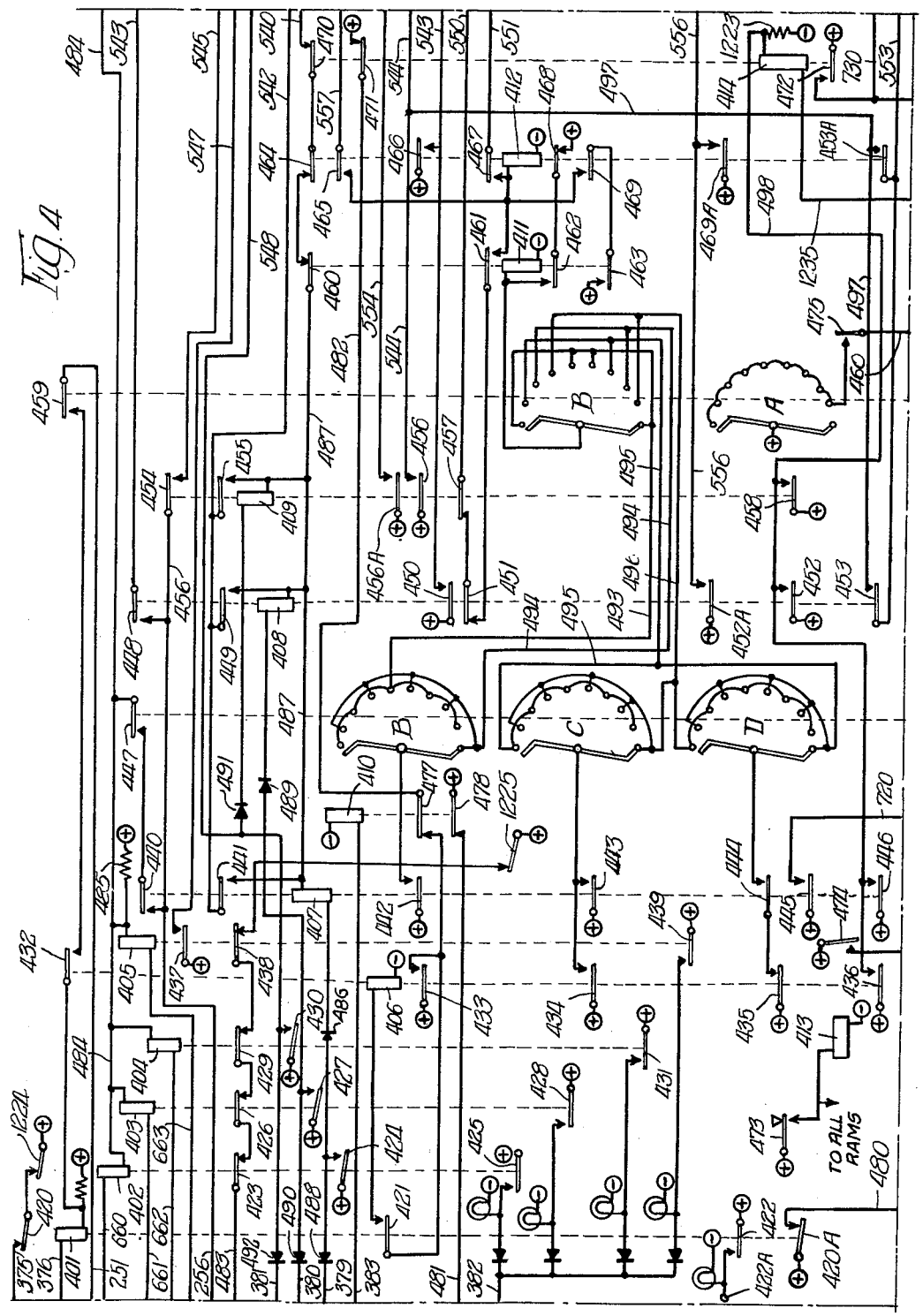

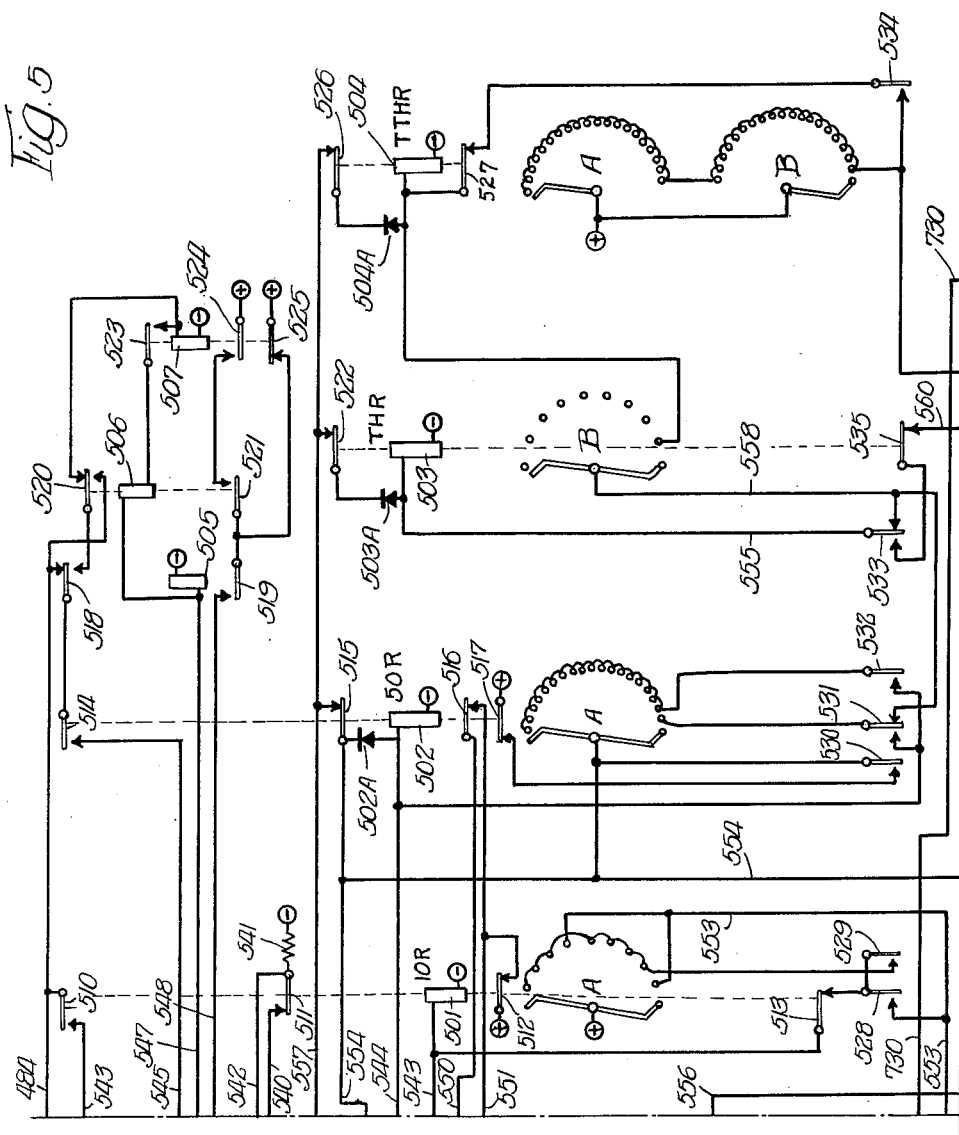

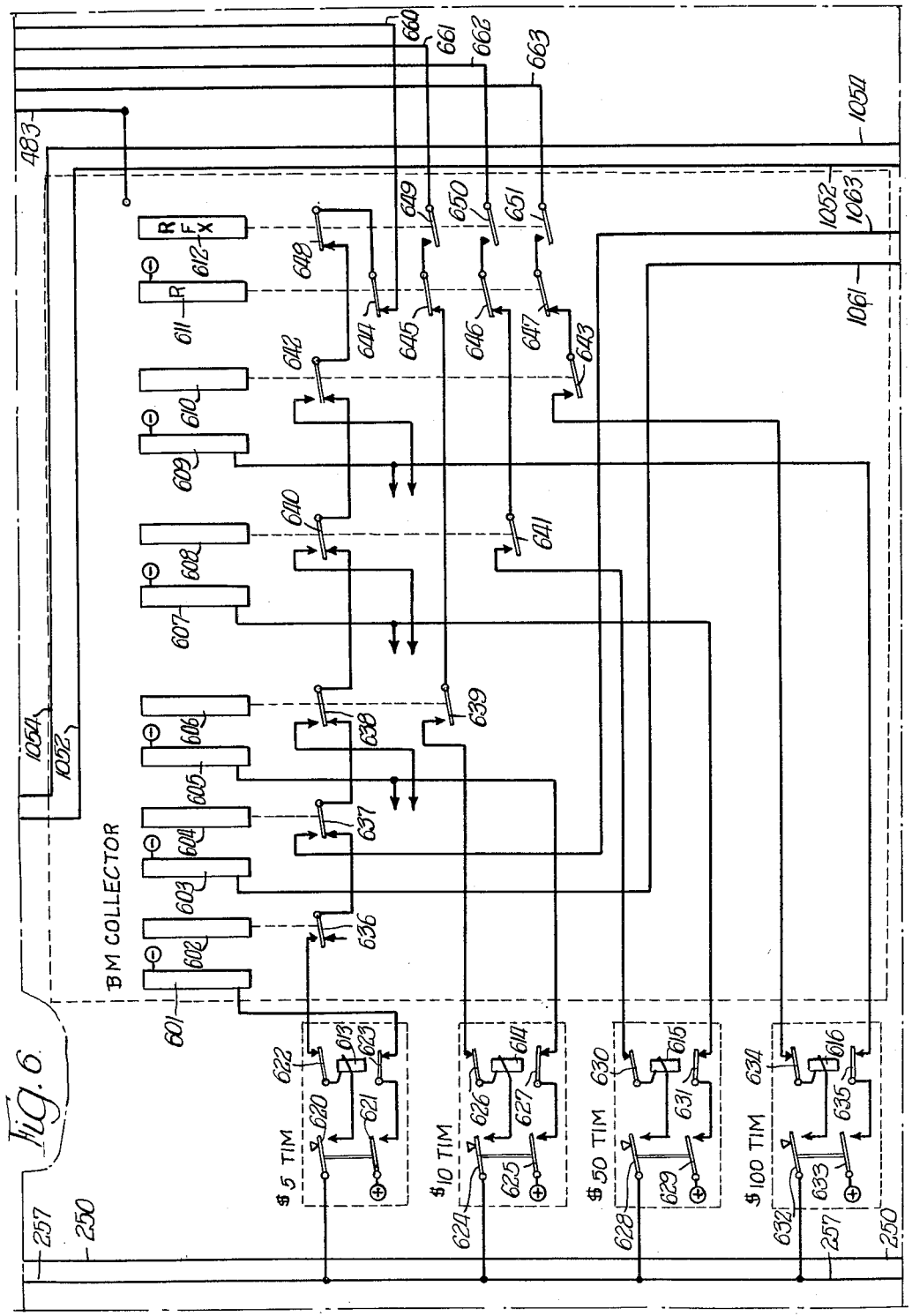

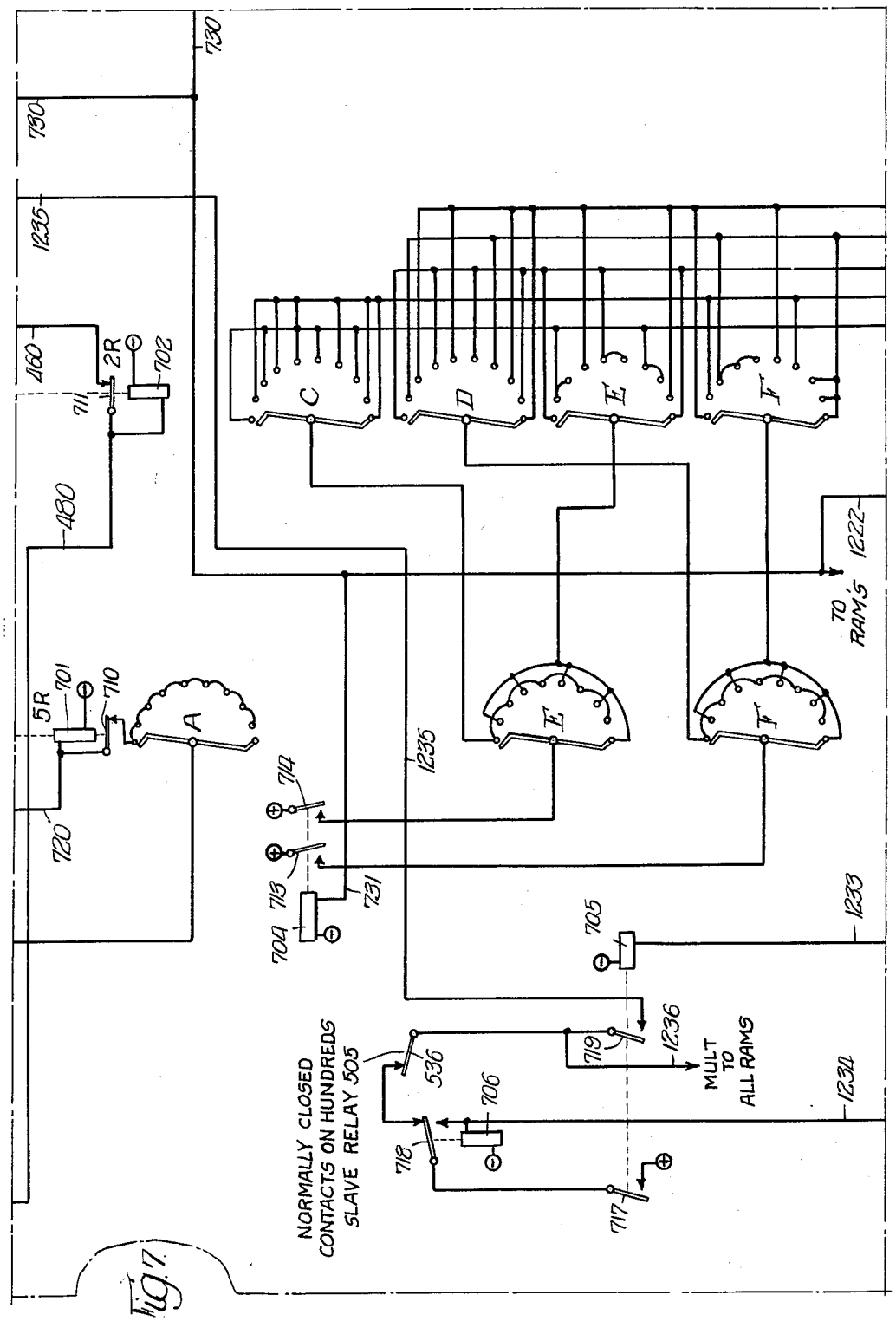

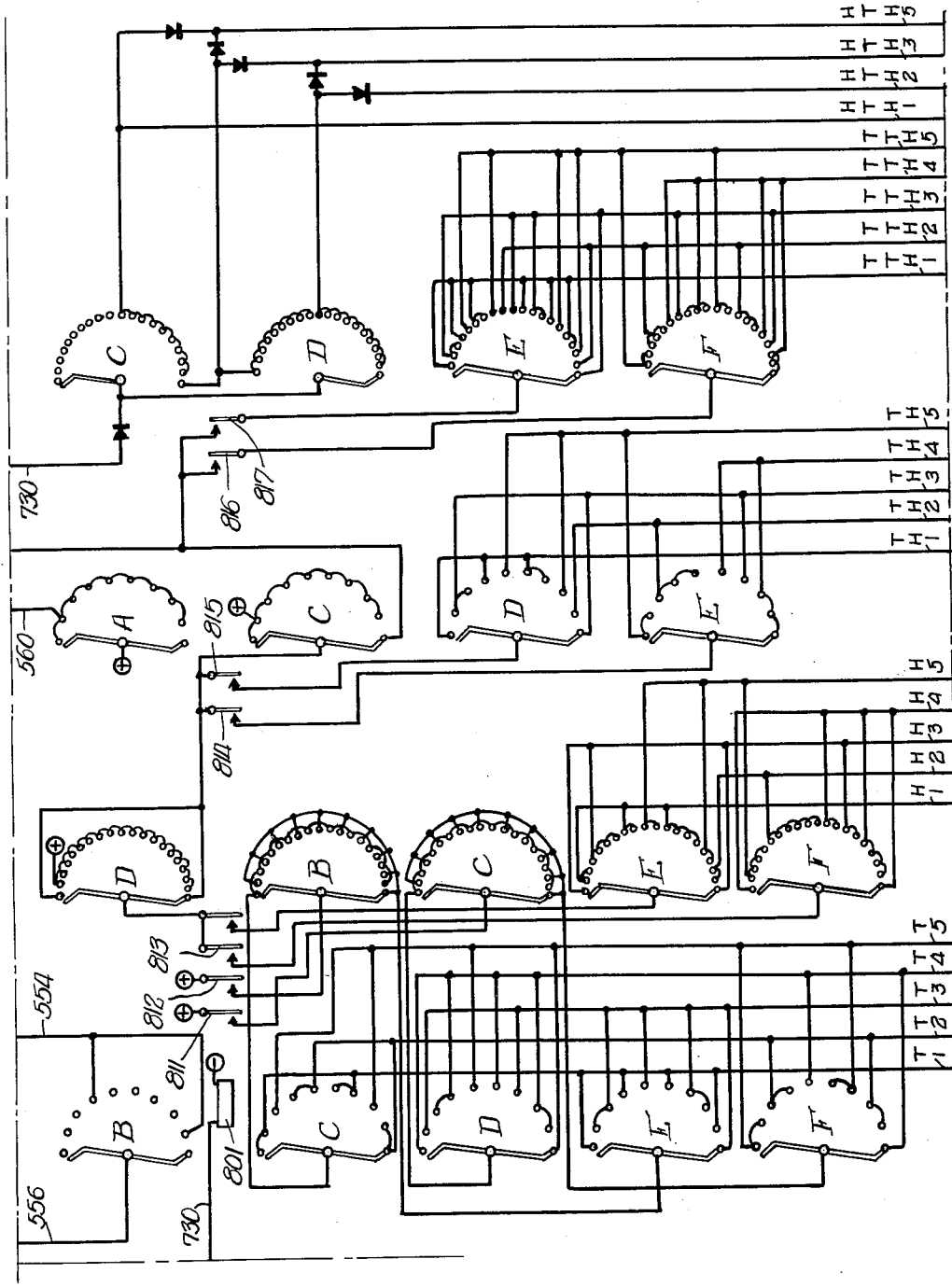

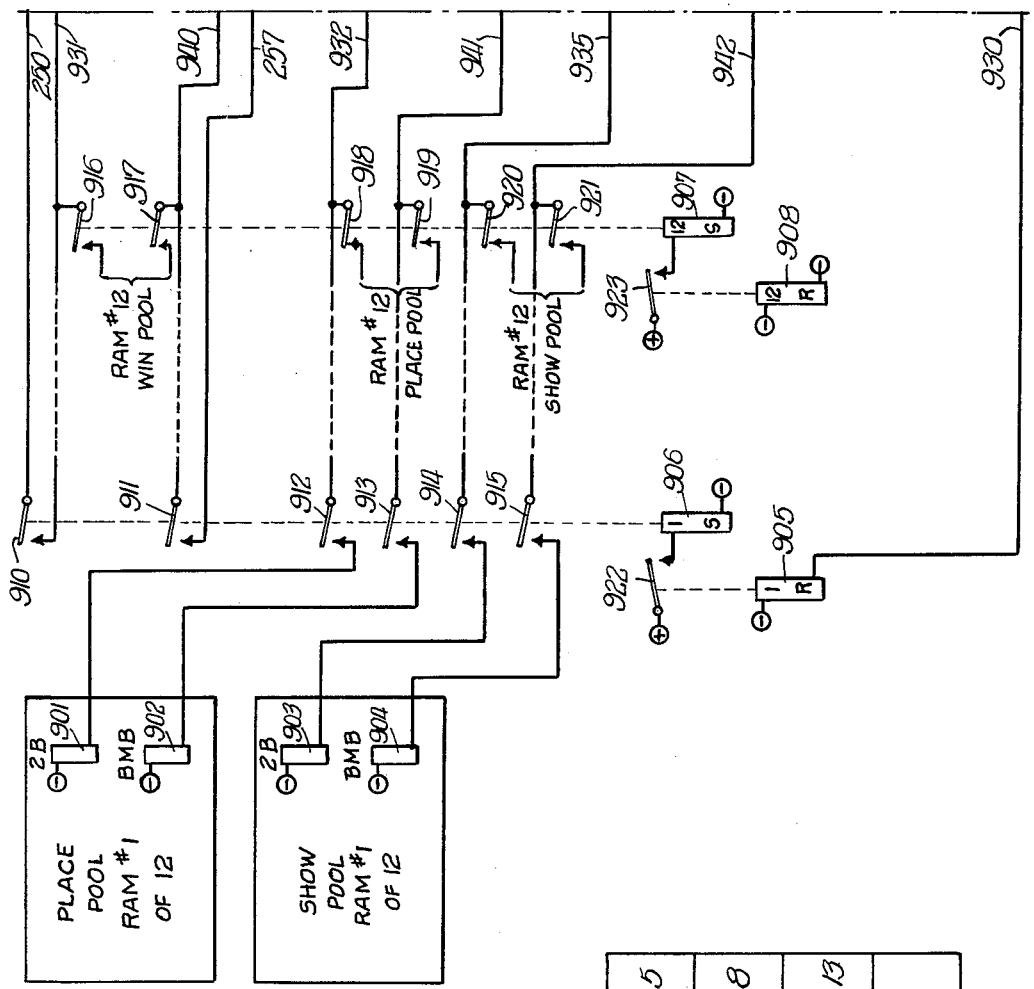

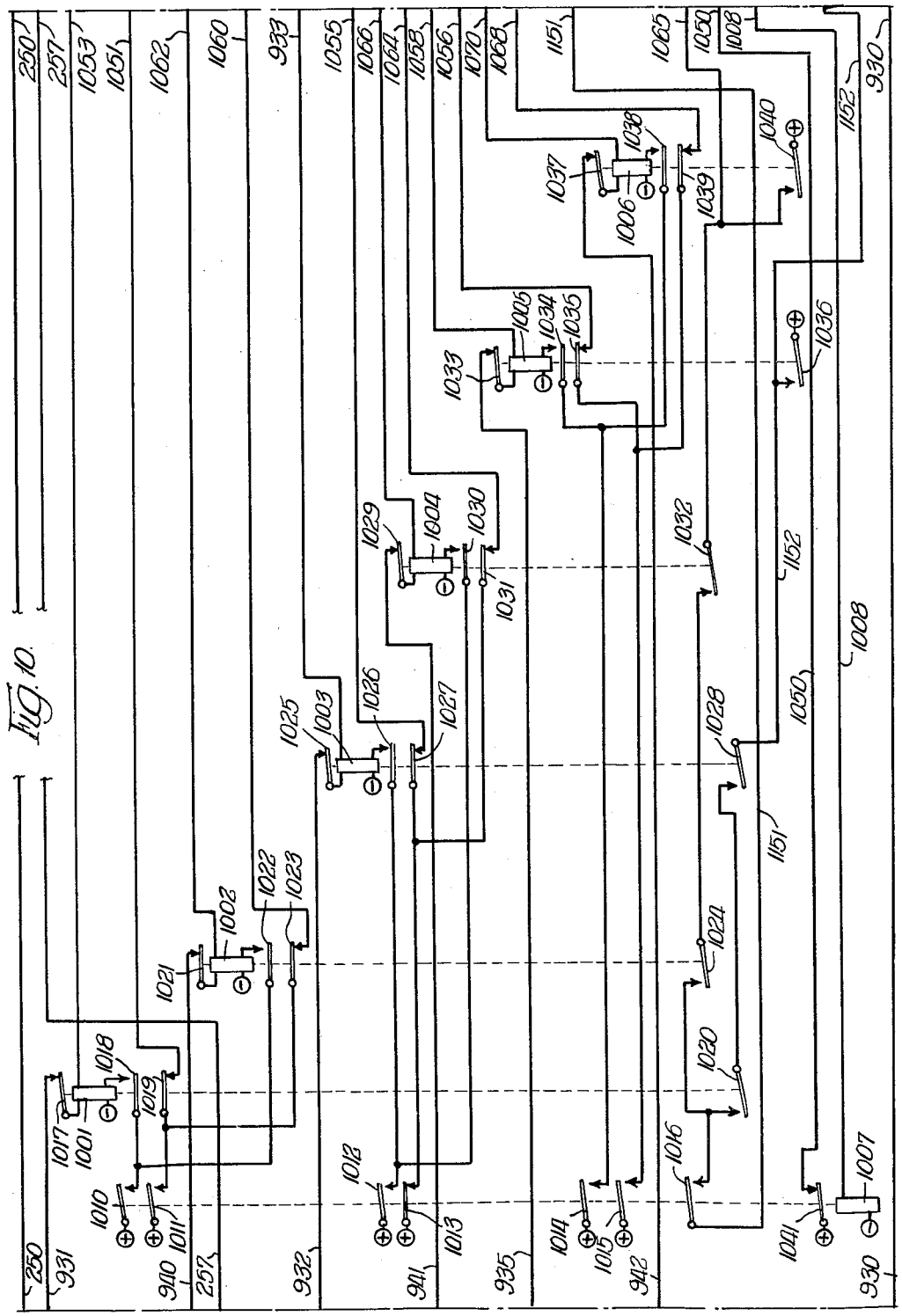

Aug. 28, 1962 LE ROY J. LANGE 3,051,384
TOTALISATOR SYSTEM
Filed Oct. 9, 1959 14 Sheets-Sheet 11

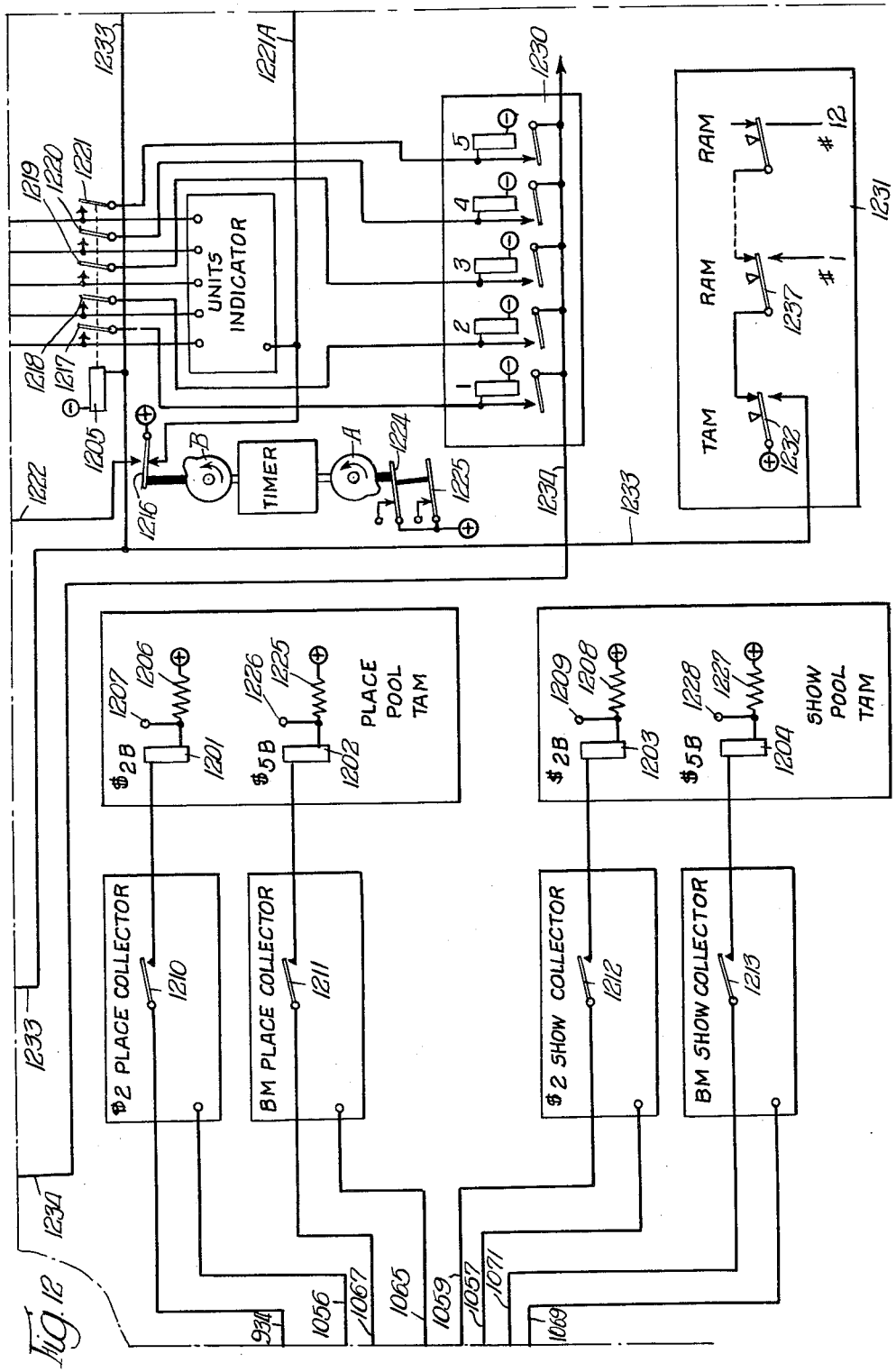

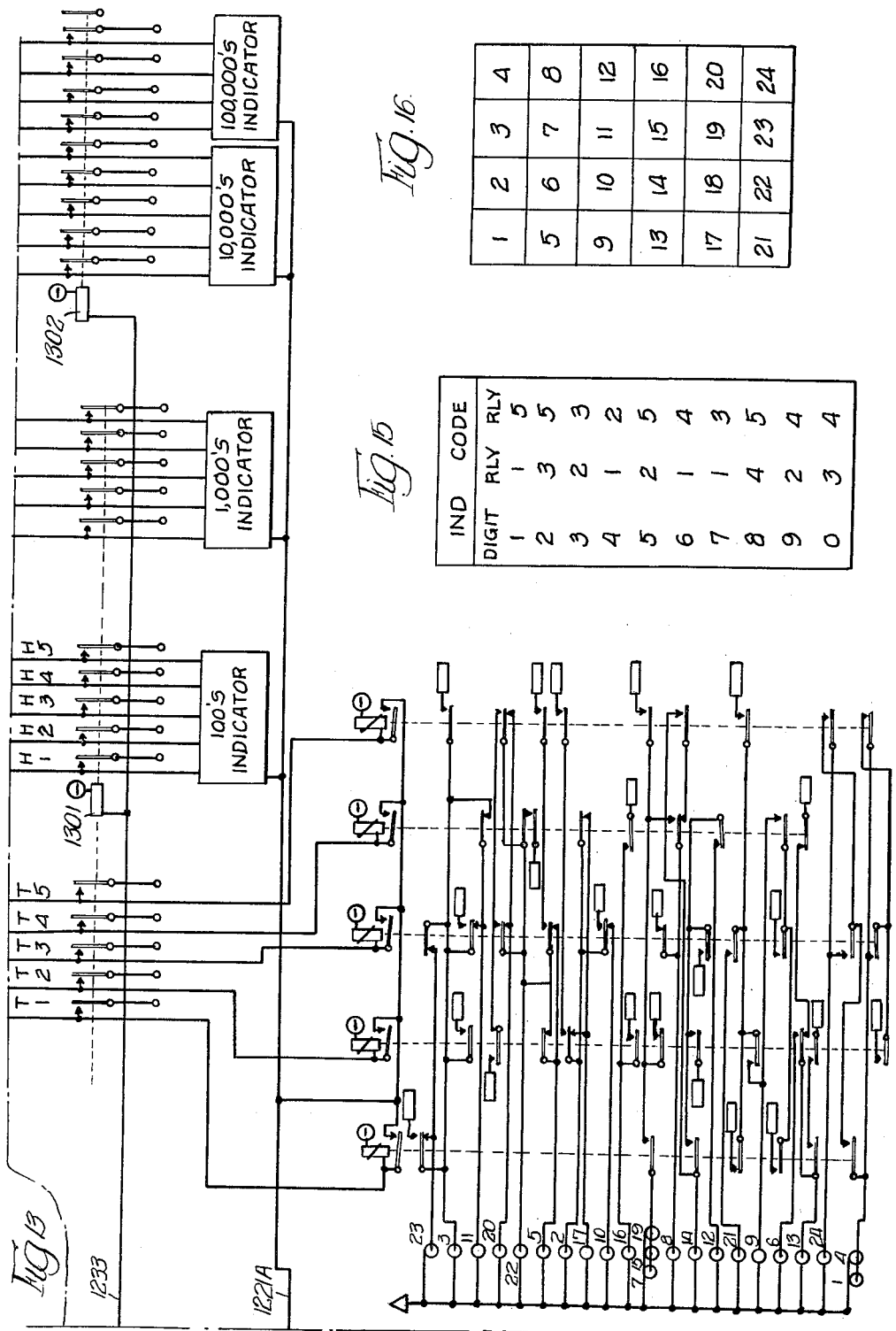

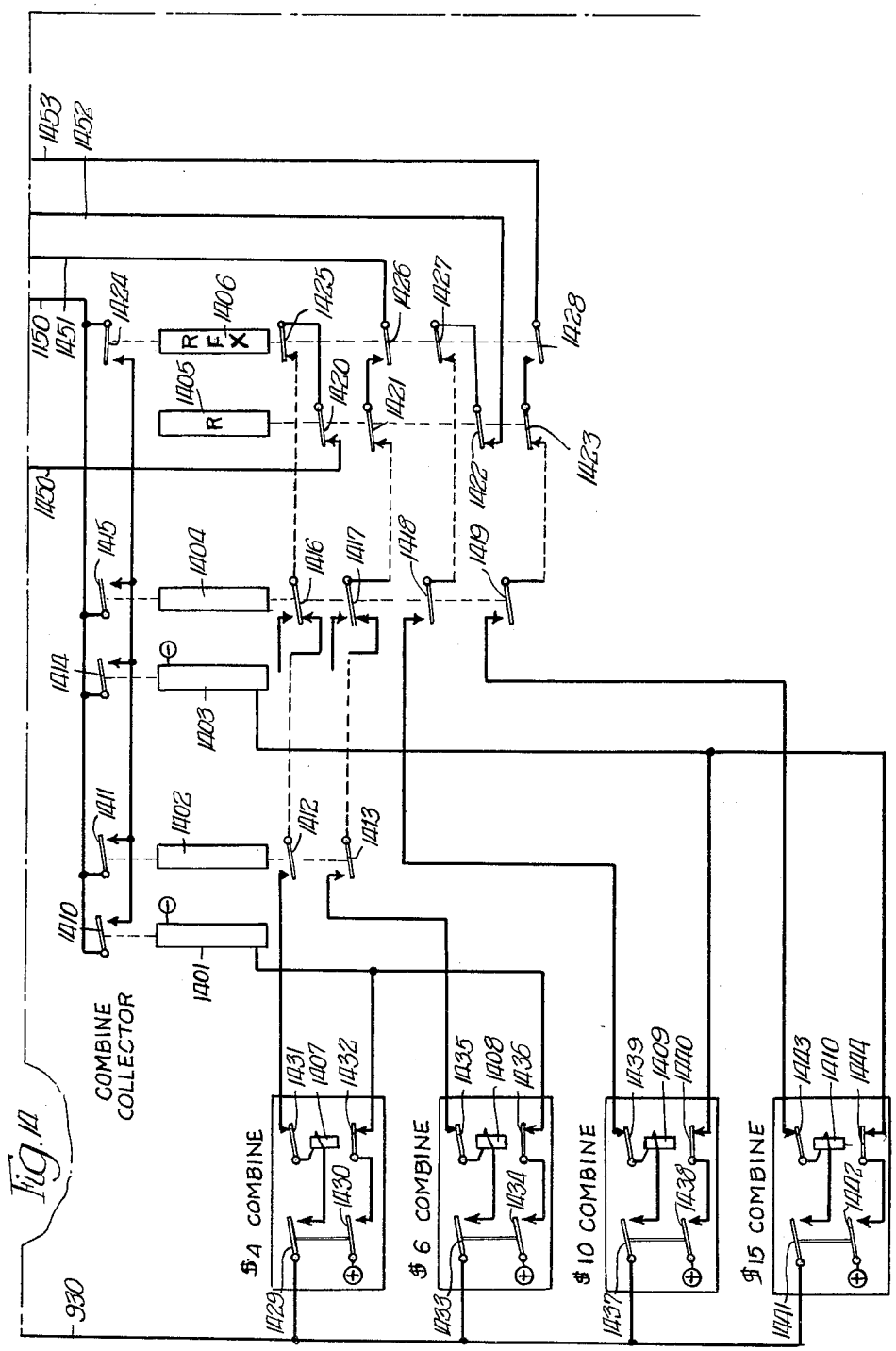

United States Patent Office 3,051,384
Patented Aug. 28, 1962

3,051,384
TOTALISATOR SYSTEM
Le Roy J. Lange, Towson, Md., assignor to American Totalisator Company, Division of Universal Controls, Inc., Towson, Md., a corporation of Maryland
Filed Oct. 9, 1959, Ser. No. 845,395
17 Claims. (Cl. 235—92)

This invention relates to totalisator systems and has for its principal object the provision of a new and improved system of this kind.

It is a main object of the invention to provide a totalisator system for use in installations where the required number of ticket machines can be handled on two channels without undue delay.

Another object of the invention is to provide a totalisator system in which a total adding machine is used in conjunction with an individual runner adding machine for the maximum number of runners that can be entered in a race at the track, and in which the individual runner adding machines contain a minimum of control components which are controlled through the total adding machine.

Another object of the invention is to provide a two-channel totalisator system in which two-dollar ticket sales are accepted over one channel, and five, ten, fifty and one hundred dollar ticket sales are accepted over the other channel.

Another object of the invention is to provide a two-channel totalisator system in which each channel is equipped with a direct acting collector through the operation of which the total adding machine may be connected to a ticket machine in each of two groups simultaneously.

Another object of the invention is to provide a two-channel totalisator system in which interference between the channels is prevented by means located in the total adding machine.

Another object of the invention is to provide a totalisator system in which values are registered in the adding machines on stepping switches, and in which those values are displayed on indicators controlled directly through the wipers and contact banks of the switches.

Another object of the invention is to provide in a totalisator system adding machines having a fifty-dollar stepping switch that is operated two steps to register a one hundred dollar transaction.

Further objects of the invention, not specifically mentioned here, will be apparent from the detailed description and claims which follow, reference being had to the accompanying drawings in which a preferred embodiment of the invention is shown by way of example and in which:

FIG. 1 is a block diagram showing the invention;

FIG. 2 is a schematic diagram of an individual runner adding machine;

FIG. 3 is a schematic diagram of a $2.00 collector unit;

Figure 11:
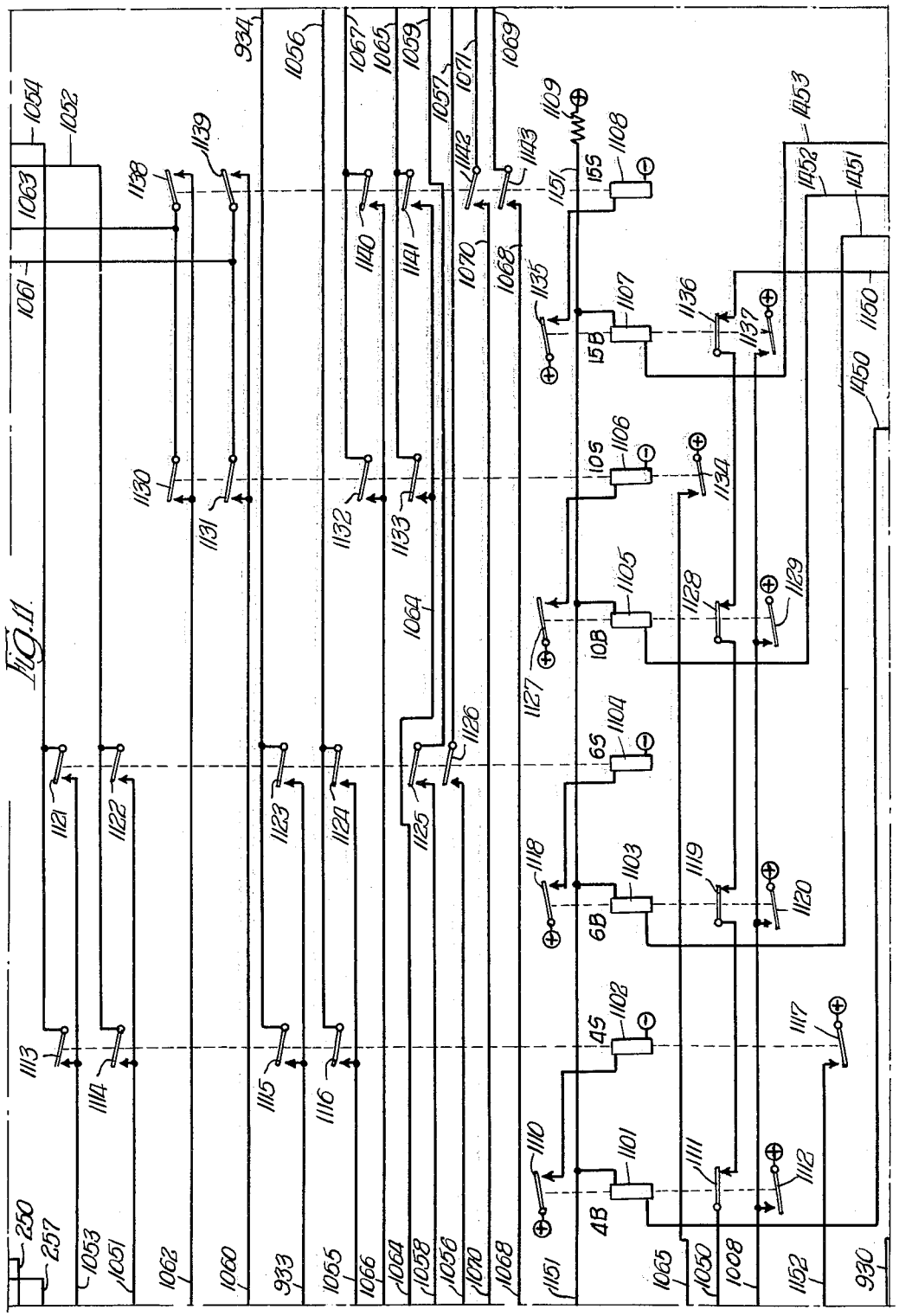

FIGS. 4, 5, 7 and 8 contain a schematic diagram of the total adding machine;

FIG. 6 is a schematic diagram of a big money or BM collector unit;

FIGS. 9, 10, 11 and 12 contain a schematic and block diagram of the combine unit;

FIG. 13 is a block diagram of the indicator system with a schematic diagram of the tens digit indicator;

FIG. 14 is a schematic diagram of the combine collector and ticket machines;

FIG. 15 is an indicator code chart;

FIG. 16 is an indicator lamp position chart; and

FIG. 17 is a diagram illustrating the manner in which the various figures of the drawing are to be coupled together.

The totalisator system of the present invention is a two-channel system designed for use at tracks where a limited number of ticket issuing machines will suffice and where the sale of tickets can be handled by two channels without undue delay. The ticket machines, referred to as TIM's, are each arranged to issue $2.00, $5.00, $10.00, $50.00 or $100.00 tickets, to be registered in one of three pools, and in addition combine TIM's are employed to issue tickets to be registered in two or more pools.

In most instances sale of $2.00 tickets requires more TIM's than does the sale of the higher value tickets. Accordingly the $2.00 TIM's in the group are connected to the total adding machine or TAM, one at a time, by a collector that is individual to that group. Preferably this collector is a direct acting all relay collector of the type shown in Patent 2,179,698, issued to Levy on November 14, 1939, modified by the addition of a reflex chain which doubles the number of TIM's that can be connected by the collector. In one instance, a 32-circuit collector is used in connection with 64 TIM's, 32 of which are connected through a main chain and 32 through a reflex chain. Included in these 64 TIM's are the $4.00 combine TIM's arranged to issue tickets registered in the win and show pools, and the $6.00 combine TIM's arranged to issue tickets registered in the win, place and show pools.

The higher value or so-called "big money" or BM TIM's that is, the $5.00, $10.00, $50.00 and $100.00 TIM's, are connected to the TAM, one at a time, by a second or BM collector which is identical with the $2.00 collector and is capable of handling a required number of 64 TIM's, half of which are on the main chain and half on the reflex chain. Included in these BM TIM's are the $10.00 combine TIM's arranged to issue tickets to be registered in the win and place pools, and the $15.00 combine TIM's arranged to issue tickets to be registered in the win, place and show pools.

The TIM's used are of the type shown in the Black Patents 1,886,626 and 1,886,627, issued November 8, 1932. Sufficient to note here that in American practice each TIM contains 12 keys, operable one at a time to select one of 12 runners. While American practice limits the number of runners that can be entered in a race to 12, in other countries a larger number of entries is permitted and the TIM's used are equipped with a key for each runner and there is a RAM for each key.

An operated key in the TIM is locked in operated position throughout the cycle of operation of the machine that prints and issues the ticket. An operation of any one of the keys closes a start circuit. An acceptance relay in the TIM is operated upon completion of the registration of the ticket in the TAM and the selected runner adding machine or RAM. Operation of the acceptance relay initiates the cycle of operation of the TIM to print and issue the ticket, at the end of which cycle the TIM is restored to normal in readiness for the next operation.

The TAM in each pool, in addition to the B relays, contains a slave relay for each B relay, a $5.00 register switch 5R, a $2.00 register switch 2R, a $10.00 register switch 10R, a $50.00 register switch 50R, a $1,000.00 register switch THR, and a $10,000.00 register switch TTHR through which $10,000.00 and $100,000.00 registrations are controlled. These switches, six in number, are all of well known type, each having a motor magnet and a plurality of wipers that are advanced one step upon each de-energization of the motor magnet. Switches 5R, 2R, 10R and THR have banks of 10 contacts for each wiper, and switches 50R and TTHR have banks of 20 contacts for each wiper.

It will be noted that there is no $100.00 register switch in the TAM and RAM's; rather control relays are provided to step the switch 50R two steps to register a $100.00 transaction. The TAM is also provided with transfer relays, and alarm, indication and reset relays, as will presently appear.

Indicator boards by which the amounts of money in each pool and on each runner in the pool are displayed, may be employed in this system. Control of these indicators is effected directly through the banks of the various register switches. In some instances, the indicator boards are arranged to display only probable odds, and the system is adapted to transfer values registered in the various switches to miniature indicators in the computing room one at a time and in sequence to facilitate computation and display of the probable odds.

Since there are 12 or more RAM's associated with each TAM, simplification of the RAM's by locating as many of the control components as possible in the TAM results in savings in the cost of building, transporting and maintaining the equipment. To this end, each RAM is equipped with but two B relays, namely a 2B and a BMB relay. All big money bets are registered in the RAM through the BMB relay and a slave relay that corresponds to the value of the ticket being registered. Each RAM is equipped with register switches that duplicate those in the TAM.

Referring now to FIG. 1, it will be seen that the win TAM contains 5 bet accepting relays designated as 2B, 5B, 10B, 50B and 100B.

The 2B relay is connected through the $2.00 collector to a $2.00 TIM and the connection extended through an operated key therein to the 2B relay of the selected RAM. Then thus connected 2B relays are operated and circuits originating in the TAM extend over the control paths to the RAM to effect registration of a $2.00 transaction in both machines. These control paths by-pass the collector.

The 5B relay of the TAM is connected through the BM collector to a $5.00 TIM and a circuit extended through an operated key therein to the big money betting relay BMB of the selected RAM. The TAM extends circuits over the control paths to cause registration of a $5.00 transaction in both machines.

In a similar manner, the 10B relay is connected through the BM collector and a $10.00 TIM to the BMB relay of the selected RAM to effect registration of a $10.00 transaction in both machines; and the $50.00 and $100.00 B relays of the TAM are connected through this same collector and the $50.00 and $100.00 TIM's respectively to the BMB relay of the selected RAM to register $50.00 and $100.00 registrations respectively in both machines.

The place pools and show pools duplicate the win pool, and a $4.00 combination TIM is connected through a combine collector to a combine unit, from which a circuit is extended through the $2.00 collector to the 2B relay of the win TAM, a circuit is extended through the $2.00 place collector to the 2B relay of place TAM, a circuit is extended from the combine unit to the 2B relay of the selected RAM in the win pool and also to the 2B relay of a selected RAM in the place pool. The place TAM controls the place RAM over a control path that by-passes the collector, and registration of the $4.00 combine ticket is thus effected in both pools.

The $6.00 combine TIM is connected by the combine collector to the combine unit, and the above two circuits are extended by that unit. In addition, the combine unit extends a circuit through the $2.00 show collector to the 2B relay of the show TAM and to the 2B relay of the show RAM corresponding to the selector selected runner. Control paths are extended as before, and registration of the combine ticket is effected in all three pools.

In a similar manner, a $10.00 combine TIM is connected by the combine collector to the combine unit and circuits extended therefrom to the 5B relay in the win TAM and the BMB relay in the selected win RAM, and to the 5B relay in the place TAM and BMB relay in the selected place RAM, these connections being extended through the win and place BM collectors.

The $15.00 combine TIM is connected by the combine collector to the combine unit and the above circuits to the 5B relays of the win and place TAM extended as before, and in addition the circuit is extended through the BM show collector to the 5BM relay of the show TAM and to the BMB relay of the selected show RAM, and registration of the combine ticket is thus registered in all three pools.

*Registering a $2.00 Bet on Runner Number One in the Win Pool*

Assuming that all of the equipment is in the normal position in which it is shown in the drawings, and assuming further that the first ticket to be sold is a $2.00 ticket on runner number one in the win pool, key 368 of a $2.00 TIM will be operated and locked in operated position. Operation of key 368 operates spring 369 into engagement with its make contact and a circuit may now be traced through positive through spring 369 and its make contact, spring 371 and its break contact, through the winding of collector start relay 301 to negative. Collector start relay 301 operates over this circuit and at spring 320 and its make contact closes a circuit which may be traced from positive on spring 1224 and its break contact, spring 420 and its break contact, conductor 375, spring 326 and its make contact, conductor 376A, spring 346 and its break contact, spring 350 and its break contact, spring 369 and its break contact, spring 353 and its break contact, thence through the chain of contacts extending through springs 341, 332 and intervening break contacts to spring 321, through spring 321 and its make contact, through the winding of collector relay 302 to negative. Relay 302 operates over this circuit and at spring 325 and its make contact closes a holding circuit for itself that extends over the holding chain through spring 335 and its break contact, spring 343 and its break contact, spring 356 and its break contact, to positive. At spring 323, relay 302 opens the previously traced circuit to spring 321 over which it was initially operated, and extends the circuit through spring 324 and its make contact, spring 330 and its break contact, spring 339 and its break contact, through the winding of reset relay 309 to negative. Relay 302 at spring 327 and its make contact closes a circuit which may be traced from the 2B relay 207 of the number one RAM, conductor 250, through key 368 and its make contact, through the winding of the TIM acceptance relay 314, through spring 370 and its break contact, spring 327 and its make contact, spring 336 and its break contact, spring 344 and its break contact, spring 359 and its break contact, spring 357 and its break contact, conductor 376, through the winding of the 2B relay 401 of the TAM, through resistance 476 to positive. Relays 401 and 207, being low inductance and hence high speed relays, operate over this circuit; however, relay 314 does not receive sufficient current to operate it in view of the inclusion of resistance 476 in the circuit. Relay 401, upon operating, moves spring 420 out of engagement with its break contact, thereby opening the circuit previously traced to 309 to prevent that relay from operating. Relay 309 has higher inductance at relay 401 and consequently does not operate before its circuit is opened.

Operation of relay 401, upon moving spring 420A into engagement with its make contact, closes a circuit from positive therethrough to conductor 480, through the winding of motor magnet 702 of the switch 2R, to negative, operating that magnet preparatory to advancing the wipers of the switch as the magnet is de-energized.

Operation of relay 401 at spring 421 closes a circuit which may be traced from positive at spring 471 and its break contact, conductor 482, spring 477 and its break contact, through spring 421 and its make contact, through the winding of $2.00 slave relay 406 to negative, operating that relay which, at spring 433 and its make contact, closes the obvious holding circuit for itself.

Operation of relay 207 closes a circuit which may be traced from positive, spring 478 and its break contact, conductor 481, through spring 220 and its break contact, spring 248 and its make contact, through the winding of $2.00 slave relay 205 to negative, operating that relay.

Operation of relay 207, at spring 249 and its make contact, closes a circuit from positive, through the winding of the motor magnet 213 of the switch 2R in the selected RAM preparatory to advancing the wipers of that switch as the magnet de-energizes. Operation of magnet 213 moves spring 240 into engagement with its make contact.

The $2.00 acknowledging circuit may now be traced from positive at spring 240 and its make contact, spring 243 and its make contact, conductor 251, through spring 459 closed against its make contact by the operation of magnet 702, spring 432 closed against its make contact by the operation of relay 406, to the junction of the winding of relay 401 and resistance 476, thus short-circuiting resistance 476.

Elimination of resistance 476 from the circuit through acceptance relay 314 of the TIM operates that relay which is held in operated position by a holding circuit in the TIM, not shown. Operation of relay 314 at spring 370 opens the above circuit over which relays 207 and 401 were operated, causing those relays to restore. At spring 371, relay 314 opens the circuit over which start relay 301 was operated, causing that relay to restore. Relay 314, upon operating, initiates a cycle of operation by which a ticket is printed and issued, and at the end of that cycle key 368 and relay 314 are restored to normal.

Restoration of relay 207 opens the previously traced circuit of the magnet 213, causing that magnet to restore and thereby advance the wipers of the RAM switch 2R one step. Restoration of relay 401 opens the previously traced circuit of the motor magnet 702, causing that magnet to restore and thereby advance the wipers of the TAM switch 2R one step. Restoration of relay 207 at spring 248 opens the circuit over which relay 205 was operated, causing that relay to restore. Restoration of relay 401 opens spring 421 thereby opening the circuit over which relay 406 was operated, causing that relay to restore. The TAM and RAM are thus restored back to normal and in readiness for the next operation.

*Collector Operations*

Restoration of relay 301 did not effect restoration of relay 302 since that relay is held up over the locking chain previously traced to positive on spring 356 and its break contact. Restoration of relay 401 re-applied positive to the chain circuit previously traced, through spring 324 and its make contact, through the winding of relay 309 to negative. This circuit is maintained long enough to permit relay 309 to operate and close a holding circuit for itself, traceable from positive on spring 361 and its break contact, spring 354 and its make contact, through the winding of the relay to negative. Operation of relay 309 opens spring 356 from its break contact, thereby opening the chain circuit over which relay 302 was held operated, causing that relay to restore. Spring 356, moving into engagement with its make contact, closes a circuit from positive, through the winding of a second reset relay 311 to negative, causing that relay to operate and close a holding circuit for itself traceable from positive through spring 361 and its make contact. At spring 355, relay 309 closes a circuit from positive through that spring and its make contact, spring 351 and its break contact, through the lower winding of relay 307 to negative, operating that relay which at spring 348 and its make contact extends a circuit from positive through the lower winding of relay 308 and through the lower winding of relay 307 to negative. Positive thus being applied to both terminals of lower winding of relay 308 prevents that relay from operating at the moment. At spring 349, relay 307 extends a circuit from positive through the winding of reflex relay 310 to negative, operating that relay which at spring 359 disconnects the main chain from spring 357 and connects the reflex chain thereto.

Operation of relay 311 at spring 361 opens the holding circuit of relay 309, causing that relay to restore, whereupon at spring 355 positive is removed from the circuit over which relay 307 was operated, thereby removing positive from the spring 348. Relay 308 now operates in series with the lower winding of relay 307 and thus maintains relay 307 operated.

Restoration of relay 309 re-engages spring 356 with its break contact, re-establishing the holding chain which is now extended through spring 326 and its break contact, conductor 377, spring 362 and its make contact, through the lower winding of relay 311 to negative. Both windings of relay 311 now being energized, the relay restores since those windings oppose each other, as indicated by the arrows.

If at the moment there is no ticket machine on the reflex chain having an operated key, and such is assumed, the circuit previously traced from positive on spring 420 and its break contact, to conductor 375, upon restoration of relay 311, will be extended through spring 358 and its make contact, springs 346 and 350 and their respective make contacts, spring 360 and its break contact, spring 353 and its break contact, thence over the previously traced chain to spring 321 and through the break contact of that spring and thence over the previously traced circuit to relay 309 to negative. Since no ticket machine contains an operated key, this circuit will be maintained long enough to permit relay 309 to operate a second time.

Upon operating relay 309 closes its holding circuit to positive on spring 361 as before, and at spring 353 opens the circuit over which it was operated. Positive on spring 355 is now extended through the make contact thereof, thence over parallel paths the first through spring 352 and its make contact, through the upper winding of relay 308 to negative. Relay 308 is maintained operated over this circuit since its two windings aid each other. The second branch from spring 355 extends through spring 351 and its make contact, spring 347 and its make contact, through the upper winding of relay 307 to negative. Both windings of relay 307 now being energized, the relay restores since those windings oppose each other, as indicated by the arrows. Restoration of relay 307 opens the circuit of relay 310, which restores.

Operation of relay 309 closes the circuit of relay 311, as before, and at spring 361 the holding circuit of relay 309 is opened and that relay restores. Restoration of relay 309 opens the circuit through the upper winding of relay 308 and that relay restores. Restoration of relay 309 re-applies positive to the holding chain, and since under the assumed conditions all collector relays are at normal, that chain extends from conductor 377 over the previously traced circuit through the lower winding of relay 311 to restore that relay. The collector is thus restored to normal and the positive placed on conductor 375 is not extended to conductor 376A until the operation of a key in a $2.00 TIM operates an associated start relay.

*Simultaneous Operation of Key in TIM's on Main and Reflex Chains*

Assuming now that a key selecting runner number one is depressed in a $2.00 TIM on the main collector chain and that simultaneously therewith or before the thus selected ticket has been issued, a key is depressed to select runner number one in a $2.00 TIM on the reflex chain. Assume, further, that both operated TIM's are the first in their respective groups.

Operation of key 368 in the number one TIM of the main chain operates relay 301 as before, and the registration and issuance of the ticket is the same as before, however, when relay 314 operates and opens spring 371 from its break contact, relay 301 is not de-energized since operation of key 372 in the first reflex TIM closes a circuit from positive, through spring 373 and its make contact, spring 374–A and its break contact, to maintain relay 301 operated.

The collector operates as before to restore collector relay 302 and to operate reflex relay 310. Positive is thus placed on conductor 376A through spring 320 and its make contact, and also through spring 358 and its make contact, whereupon relay 302 is again operated and the previously traced circuit from negative through relay 207 and conductor 250 is now extended through key 372 and its make contact, acceptance relay 315, through spring 374 and its break contact, through spring 328 and its make contact, through springs 337 and 345 and their respective break contacts, spring 359 and its make contact, spring 357 and its break contact, conductor 376, thence through the winding of relay 401 through resistance 476 to positive. The relays 207 and 401 operate as before and registration of the $2.00 sale is effected in both the TAM and the RAM; and upon completion of the previously described acknowledging circuit, relay 315 is operated to initiate a cycle of the TIM through which the ticket is printed and issued.

The registration having thus been completed, the collector starts searching for other operated TIM's and finding none restores to normal as before.

*Registering a $5.00 Bet on Runner Number One in the Win Pool*

Assume now that key 620 in a $5.00 TIM is operated to initiate the sale of a $5.00 ticket on runner number one to win. A circuit is thus closed from positive through spring 621 and its make contact, spring 623 and its break contact, through the winding of relay 601 to negative. The TAM now being at normal, a circuit may be traced from positive on spring 1225 and its break contact, through spring 438 and its break contact, spring 429 and its break contact, spring 426 and its break contact, spring 423 and its break contact, conductor 483, to the start chain of the BM collector shown in FIG. 6.

It will be understood that this collector contains the start chain and holding chain the same as the $2.00 collector, and that the operating circuits have been omitted from FIG. 6 to avoid an unnecessary complication of the drawing.

The positive on conductor 483 is extended to collector relay 602 and thence to negative, operating that relay which closes a holding circuit for itself in the same manner as described in connection with relay 302.

A circuit may now be traced from negative through the BMB relay 206 in the RAM, conductor 257, through key 620 and its make contact, through the winding of TIM acceptance relay 613, spring 622 and its break contact, spring 636 and its make contact, thence through the chain of contacts extending through springs 637, 638, 640, 642 and 648, and their respective break contacts, spring 644 and its break contact, conductor 660, through the winding of 5B relay 402 in the TAM, conductor 484, through resistance 485, to positive. Relays 206 and 402, being low inductance hence high speed relays, operate over this circuit, but the inclusion of resistance 485 therein prevents relay 613 from operating at the moment.

Operation of relay 402 at spring 423 removes positive from conductor 483 thereby to stop the BM collector. At spring 424, relay 402 closes a circuit from positive through diode 486, through the winding of $5.00 slave relay 407, conductor 487, spring 460 and its break contact, spring 464 and its break contact, spring 470 and its break contact, conductor 540, through spring 511 and its break contact, through resistance 541 to negative. Relay 407 operates over this circuit.

Operation of relay 407 closes a circuit from positive through spring 445 and its make contact, conductor 720, through the winding of motor magnet 701 of switch 5R to negative, operating that magnet preparatory to advancing the wipers of the switch one step.

Operation of relay 402 also closes a circuit from positive, through spring 424 and its make contact, diode 488, conductor 379, spring 244 and its make contact, through the winding of the $5.00 slave relay 204 in the RAM number one, conductor 252, through springs 223 and 224 and their respective break contacts, spring 221 and its break contact, conductor 253, spring 234 and its break contact, conductor 254, through resistance 255 to negative. Relay 204 operates over this circuit.

Operation of relay 204 closes a circuit from positive through spring 239 and its make contact, through the winding of motor magnet 214 of switch 5R to negative, operating that magnet preparatory to advancing the wipers of the switch one step.

The BM acknowledgment circuit may now be traced from positive on spring 247 and its make contact, spring 238 and its make contact, conductor 256, spring 440 and its make contact, spring 447 and its make contact, to the junction of the winding of relay 402 and resistance 485, thereby to apply positive to both ends of this resistance to short it out and thereby increase the current flowing through relay 613 of the TIM sufficiently to cause an operation of that relay.

Operation of relay 613 at springs 622 opens the circuit over which relays 402 and 206 were operated, restoring those relays. Restoration of relay 402 opens spring 424 from its make contact, thereby opening the circuit over which the $5.00 slave relay 407 in the TAM and the $5.00 slave relay 204 in the RAM were were operated, to permit those relays to restore. Restoration of these slave relays opens the previously described circuits over which the motor magnet 701 of TAM switch 5R and the motor magnet 214 of RAM switch 5R were operated, thereby permitting those magnets to restore and advance the wipers of their respective switches one step.

It will be noted that the previously traced circuit for relay 407 is extended through break contacts 460 and 464 on the transfer relays 411 and 412, also through a break contact 470 on the indication slave relay 414 and through break contact 511 on the magnet 501 of switch 10R to negative, through resistance 541. Although in the operation just described it is not necessary to do so, it will be noted that upon operating, relay 407 closes a circuit through spring 441 and its make contact, which circuit extends over conductor 542 to negative, through resistance 541, thereby to maintain 407 operated even though operation of the magnet 701 of switch 5R necessitates a transfer to switch 10R, as will presently appear.

It will also be noted that negative is applied to the $5.00 slave in the RAM through a similar chain of break contacts and through resistance 255, and that upon operating relay 204 closes a substitute circuit through spring 236 and its make contact, leading directly to negative through the resistance 255 so as to maintain the relay operated even though a transfer be involved.

Operation of acceptance relay 613 in the TIM at spring 623 opens the circuit over which start relay 601 was operated, and assuming that there are no other TIM's in readiness to register a ticket sale, the BM collector cycles itself to search for waiting TIM's on both its main and reflext chains, and finding none returns to normal, in the manner explained in connection with the $2.00 collector.

*Registering a $10.00 Bet on Runner Number One in the Win Pool*

In order to register a $10.00 bet on runner number one in the win pool, key 624 of a $10.00 TIM is depressed and locked in operated position. A circuit may now be traced from positive through spring 625 and its make contact, spring 627 and its break contact, through the winding of collector start relay 605 to negative, operating that relay. The TAM now being at normal, the previously traced circuit placing positive on conductor 483 is extended by the operation of start relay 605 to operate collector relay 606. Since the $10.00 TIM is shown to be on the reflex chain of the collector, reflex relay 612 also will be operated in the manner previously explained in connection with reflex relay 310 of the $2.00 collector.

The previously traced circuit from negative through relay 206 and conductor 257 is now extended through spring 624 and its make contact, the winding of acceptance relay 614, spring 626 and its break contact, spring 639 and its make contact, spring 645 and its break contact, spring 649 and its make contact, conductor 661, through the 10B relay 403 of the TAM, conductor 484, through resistance 485 to positive. Relays 206 and 403 operate over this circuit and the inclusion of resistance 485 therein prevents sufficient flow of current to operate acceptance relay 614.

Operation of relay 403 opens springs 426, thereby to remove positive from conductor 483 to stop the BM collector, and at spring 427 relay 403 closes a circuit from positive through diode 489, through the winding of $10.00 slave relay 408, thence over the previously traced circuit through resistance 541 to negative. Relay 408 operates over this circuit and at spring 449 and its make contact closes a holding circuit for itself, previously traced over conductor 542 to negative through resistance 541.

Relay 408, upon operating, closes a circuit from positive through spring 450 and its make contact, conductor 543, through the winding of the motor magnet 501 of switch 10R to negative, operating that magnet.

Operation of spring 427 against its make contact also closes a circuit through diode 490, conductor 380, through spring 245 and its make contact, through the winding of RAM $10.00 slave relay 203, and thence over the previously traced circuit to negative through resistance 255. Relay 203 operates over this circuit and at spring 230 and its make contact closes a holding circuit for itself over the previously traced circuit to negative through resistance 255. Relay 203 at spring 233 and its make contact closes a circuit from positive, through the winding of the magnet 212 of switch 10R to negative, operating that magnet.

The BM acknowledging circuit may now be traced from positive through spring 235 and its make contact, spring 232 and its make contact, conductor 256, spring 448 closed against its make contact by the operation of relay 408, conductor 543, spring 510 closed against its make contact by the operation of magnet 501, conductor 484, to the junction of resistance 485 and the winding of relay 403 to short-circuit resistance 485 and thereby increase the current flowing through relay 614 sufficiently to cause that relay to operate and initiate the cycle of the TIM to print and issue the $10.00 ticket.

At spring 626, relay 614 opens the circuit over which relays 206 and 403 were operated, causing those relays to restore and open the circuits of relays 203 and 408 respectively, causing those relays to restore and open the circuits of magnets 212 and 501 respectively, causing those magnets to restore and advance the wipers of their respective switches one step.

Restoration of relay 403 also re-applies positive to conductor 483, causing the BM collector to cycle itself in search of other TIM's that contain operated runner selecting keys and finding none to restore to normal in the manner explained in connection with the $2.00 collector.

*Registering a $50.00 Bet on Runner Number One in the Win Pool*

Depression of the key in a $50.000 TIM selecting runner number one closes springs 628 and 629 against their respective make contacts and a circuit is thus closed from positive through spring 629 and its make contact, spring 631 and its make contact, through the winding of collector start relay 607 to negative, operating that relay. Operation of relay 607 causes collector relay 608 to be operated. The $50.00 TIM being shown connected through the reflex chain, the BM collector cycles and reflex relay 612 is operated, whereupon the circuit previously traced from negative through relay 206 and conductor 257 is now extended through spring 628 and its make contact, through the winding of acceptance relay 615, spring 630 and its break contact, spring 641 and its make contact, spring 646 and its break contact, spring 650 and its make contact, conductor 662, through the winding of the TAM 50B relay 404 and thence over the previously traced circuit to positive, through resistance 485. Relays 404 and 206 operate over this circuit.

Relay 404 at spring 429 removes positive from conductor 483 to stop the BM collector, and at spring 430 relay 404 closes a circuit from positive through this spring and its make contact, diode 491, through the winding of the $50.00 slave relay 409 to negative over the previously traced circuit through resistance 541. Relay 409 operates, and at spring 455 closes a holding circuit for itself, previously traced over conductor 542 and resistance 541 to negative. Relay 409 closes a circuit from positive through spring 456 and its make contact, conductor 544, through the winding of magnet 502 of switch 50R to negative, operating that magnet.

Relay 404 also closes a circuit from positive, through spring 430 and its make contact, diode 492, conductor 381, spring 246 and its make contact, through the winding of RAM $50.00 slave relay 202, and thence over the previously traced circuit to negative through resistance 255. Relay 202 operates over this circuit and at spring 225 and its make contact closes the previously traced holding circuit for itself through resistance 255. At spring 227 and its make contact, relay 202 closes a circuit from positive through the winding of magnet 211 of switch 50R, operating that magnet.

The BM acknowledging circuit may now be traced from positive on spring 229 and its make contact, spring 228 and its make contact, conductor 256, spring 454 and its make contact, conductor 545, spring 514 and its make contact, spring 518 and its break contact, conductor 484, to resistance 485, thereby short-circuiting resistance 485 to increase the current flowing through relay 615, causing that relay to operate.

Operation of relay 615 at contact 630 opens the previously traced circuit through relays 206 and 404, causing those relays to restore, thereby opening the circuits of the slave relays 202 and 409, causing those relays to restore and open the circuits of magnets 211 and 502 respectively, to return the equipment to normal. Restoration of relay 404 reapplies positive to conductor 483, causing the BM collector to cycle in search of other ticket machines having depressed keys and finding none to return to normal.

*Registering a $100.00 Bet on Runner Number One in the Win Pool*

Operation of a runner number one selecting key in a $100.00 TIM closes spring 633 against its make contact, thereby extending a circuit from positive through spring 635 and its break contact, through the winding of collector start relay 609 to negative, operating that relay which extends the positive on conductor 483 to operate collector relay 610, and since the $100.00 TIM's are on the reflex chain, reflex relay 612 will likewise be operated.

The circuit previously traced from negative through relay 206 and conductor 257 is now extended through spring 632 and its make contact, through the acceptance relay 616 of the TIM, spring 634 and its break contact, spring 643 and its make contact, spring 651 and its make contact, conductor 663, through the winding of the $100.00 B relay 405 of the TAM, through resistance 485 to positive. Relays 405 and 206 operate over this circuit but relay 616 does not at the moment.

Operation of relay 405 at spring 437 closes a circuit from positive over conductor 547 through $100.00 slave relay 505 to negative, operating that relay.

Operation of relay 505 closes a circuit from positive through spring 525 and its break contact, spring 519 and its make contact, conductor 548, through diode 491, through the winding of the $50.00 slave relay 409 to negative, over the previously traced circuit, through resistance 541, operating relay 409.

This circuit also extends over the previously traced circuit through diode 492, conductor 381, spring 246 and its make contact, through the winding of the RAM $50.00 slave relay 202, thence over the previously traced circuit to negative through resistance 255. Relay 202 operates over this circuit.

Operation of relay 409 closes a circuit from positive, through spring 456 and its make contact, conductor 544, through the winding of magnet 502 of switch 50R to negative, operating that magnet.

Operation of relay 202 closes the previously traced circuit to the motor magnet 211 of the switch 50R which operates as before. The BM acknowledging circuit may now be traced from positive through spring 229 and its make contact, spring 228 and its make contact, conductor 256, through spring 454 and its make contact, conductor 545, through spring 514 and its make contact, spring 518 and its make contact, spring 520 and its break contact, through the winding of relay 507, operating that relay. At spring 525, relay 507 opens the previously traced circuit over which relay 409 in the TAM and relay 202 in the RAM were operated, causing those relays to restore and thereby opening the circuit of magnet 502 in the TAM and 211 in the RAM, causing those magnets to restore and advance the wipers of their respective switches one step.

Relay 507 closes spring 523 against its make contact, and the circuit from positive through conductor 547 to relay 505 is now extended through relay 506, spring 523 and its make contact, through the winding of relay 507 to negative. Relay 506 operates over this circuit in series with relay 507.

A circuit may now be traced from positive through spring 524 and its make contact, spring 521 and its make contact, spring 519 and its make contact, and thence over conductor 548 and the previously traced circuits to relays 409 and 202, operating those relays, causing them to close the circuit to the motor magnets 502 and 211 as before.

Positive being replaced on the conductor 256, as explained above, now extends through spring 518 and its make contact, spring 520 and its make contact, conductor 484, to the junction of resistance 485 and relay 405, shorting out that resistance to increase the flow of current in the circuit through relay 616, causing that relay to operate and initiate a cycle of operation of the TIM to print and issue the ticket. Relay 616 opens the circuits over which relays 405 and 206 were operated, causing those relays to restore, thereby opening the circuits over which relays 505, 506 and 507 were operated, causing those relays to restore, and the circuit over which relay 202 was operated, causing that relay to restore.

Restoration of these latter relays opens the circuit of the magnets 502 and 211 respectively, causing those magnets to restore and advance the wipers of their respective switches one step.

Thus it will be seen that a $100.00 bet is registered in the TAM and RAM by operating switches 50R therein through two steps.

*Transfer From the Units Register to the Tens Register*

The registration of a $5.00 bet operates switch 5R one step, in the manner hereinbefore explained. Obviously when a second $5.00 transaction is registered, transfer from the units register to the tens register becomes necessary. The registration of the first $5.00 bet will move the wipers of switch 5R operated by magnet 701 into engagement with their respective first bank contacts. When the 5B and the $5.00 slave relay 407 are operated to initiate the registration of a second $5.00 bet, a circuit may be traced from positive through spring 442 and its make contact, the B wiper of switch 5R and the first contact engaged thereby, conductor 493 that is connected to the zero contact in the bank engaged by the B wiper of switch 2R, thence through the B wiper and through the winding of the first transfer relay 411 to negative, operating that relay which closes a holding circuit for itself that may be traced from positive through spring 468 and its break contact, spring 462 and its make contact.

A circuit may now be traced from positive through spring 512 and its break contact, spring 516 and its break contact, conductor 550, spring 457 and its break contact, spring 451 and its break contact, spring 461 and its make contact, through the winding of relay 412 to negative, operating that relay. Relay 412 closes a holding circuit for itself extending through spring 467 and its make contact, conductor 551 to positive, through spring 512 and its break contact.

Relay 412 also closes a second holding circuit for itself, which may be traced from positive on spring 463 and its make contact, spring 469 and its make contact, through its winding to negative. The circuit over which relay 411 was operated will be maintained until relay 407 restores at the completion of the registration, thus insuring that relay 412 will be maintained throughout the registration cycle.

At spring 468, relay 412 opens the above traced holding circuit of relay 411, without effect at the moment. At spring 466, relay 412 closes the circuit from positive through spring 466 and its make contact, conductor 543, through the winding of motor magnet 501 of the switch 10R, operating that magnet preparatory to advancing the wipers of that switch one step as the magnet de-energizes.

Operation of magnet 501 opens springs 512 and the first holding circuit of relay 412 without effect since the relay is maintained operated over the holding circuit extending through spring 463. When relay 407 is restored at the completion of the registration, relays 411, 412, and magnet 501 restore and the transfer is completed.

Thus it will be seen that upon the initiation of the registration of a second $5.00 bet, switch 10R is operated one step, and when the acknowledging circuit is completed as above, switch 5R is operated through a second step to complete the registration.

It will be noted that the odd-numbered contacts, namely, 1, 3, 5, 7 and 9, in the bank engaged by the B wiper of switch 5R, are multiplied together. Thus each time the wiper B engages an odd-numbered contact denoting registration of an odd $5.00 in switch 5R, operation of relay 407 to initiate registration of an additional $5.00 requires transfer, and upon the operation of springs 442 the above transfer circuits are actuated.

It will also be noted that conductor 493 is connected to the first, the fifth, and the sixth, as well as the zero contact in the bank engaged by the B wiper of switch 2R. When this wiper engages the first bank contact, $2.00 is registered in the switch, bringing the total registration in switches 5R and 2R to a value ending in 7, so that when the relay 407 is operated to initiate another $5.00 registration, transfer becomes necessary and the above circuits are actauted. When the B wiper of switch 2R engages the fifth contact, $10.00 is registered in that switch, and with an odd $5.00 registered in switch 5R, transfer is again necessary when relay 407 is operated to initiate another $5.00 registration. When the B wiper engages its sixth bank contact, $12.00 is registered in that switch and transfer again becomes necessary and is effected in the manner explained above.

It will be noted that the even-numbered contacts 2, 4, 6, 8, and 0, in the bank engaged by the B wiper of switch 5R, are multipled together and connected by conductor 494 to the third and eighth contacts in the bank engaged by the B wiper of switch 2R. Thus when this latter wiper engages the third contact denoting registration of $6.00, or engages the eighth contact denoting the registration of $16.00 in switch 2R, and the wiper of switch 5R engages one of its even-numbered contacts, operation of relay 407 closes the above transfer circuits and the necessary transfer is thus effected.

The C wiper of switch 5R is connected to positive through either one of the two contacts, namely, 434 closed when the $2.00 slave relay 406 is operated, and 443 closed when the $5.00 slave relay 407 is operated. The odd-numbered contacts in the bank engaged by wiper C are multipled together and connected by conductor 495 to the second and seventh contacts in the bank engaged by the B wiper of switch 2R. Engagement of wiper B with its second bank contact denotes the registration of $4.00 in the switch, and the seventh bank contact denotes the registration of $14.00 therein.

With the C wiper of switch 5R engaging one of its odd-numbered contacts, there is registered in that switch a value containing an odd $5.00, such as $5.00, $15.00, $25.00, etc. Thus the total value registered in the two switches has a units digit of 9, and transfer is required upon the next registration, be that a registration of either $2.00 or $5.00. Thus when positive is placed on wiper C under these conditions, the transfer circuit is completed through the B wiper of switch 2R as above, to effect transfer to switch 10R.

It will be noted that the even-numbered contacts in the bank engaged by the wiper C of the switch 5R are multipled together and connected by conductor 496 to the fourth and ninth contacts engaged by the B wiper of switch 2R designating the units digit of the value registered in that switch as 8. Since the even-numbered contacts engaged by the C wiper of switch 5R denote that the value registered in there is an even number of fives, and the units digit of that sum is zero, transfer becomes necessary when the next registration is either a $2.00 registration or a $5.00 registration, and under these circumstances the placing of positive on the C wiper, as above, completes the transfer circuit through the B wiper of switch 2R in the manner previously explained.

It will also be noted that the D wiper of switch 5R will receive positive through spring 435 of the $2.00 slave relay 406 and spring 444 of the $5.00 slave relay 407 when these two relays are operated simultaneously. Under these conditions of double registration, $7.00 are being added to the value registered in the switches 5R and 2R.

It will also be noted that the odd-numbered contacts engaged by the D wiper are multipled together and connected to conductor 496 which, as previously explained, is connected to the fourth and ninth contacts engaged by the B wiper of switch 2R. Thus when relays 406 and 407 are operated simultaneously, as they can be since each is controlled over a different betting channel, transfer to switch 10R is effected through the D wiper of switch 5R and the B wiper of switch 2R.

It will be noted that the even-numbered contacts in the bank engaged by the D wiper of switch 5R are multipled together and connected to conductor 495, and placing of positive on the D wiper will complete the transfer circuit when the B wiper of switch 2R is in engagement with the second or seventh contact in its bank.

*Preventing Interference Between a Transfer From the $2.00 Channel During Registration of a Bet Over the BM Channel*

It will be noted that the circuit over which transfer relay 412 is operated, upon operation of transfer relay 411, extends through normally closed contacts 451 on the $10.00 slave relay 408, normally closed contacts 457 on the $50.00 slave relay 409, and also through normally closed contacts 516 on switch 50R and normally closed contacts 512 on switch 10R. Thus, should either of these relays or either of these magnets be operated when relay 411 is operated, operation of relay 412 is delayed until the operated relay or magnet restores. Relay 411, upon operating, is maintained operated over the holding circuit through springs 468 until relay 412 is operated. Thus if transfer is initiated by an operation of the $2.00 slave relay 406 and closing of spring 434 against its make contact, the previously traced $2.00 acknowledging circuit may be completed and relay 406 restored before relay 412 operates. The transfer is not lost and relay 412 is operated as soon as its circuit is completed, notwithstanding the restoring of relay 406.

From the foregoing, it is apparent that accumulation of values in the $2.00 register are transferred to the $10.00 register whenever necessary. Obviously, then, if a trouble condition exists in the big money channel, such transfers will be lost if the $2.00 channel is permitted to operate. This loss of transfers is prevented in the following manner.

The 5B relay 402 carries a spring 425 closed against its make contact when the relay operates. A 10B relay 403 has a similar spring 428, similarly closed. The 50B relay 404 likewise carries a similar spring 431 and the 100B relay 405 carries a spring 439. Operation of relay 402, for example, closes a circuit from positive through spring 425 and its make contact through a signal lamp associated with the relay 402 and a diode individual thereto, to a conductor 382 that is common to the lamps and diodes of the other big money relays.

Conductor 382 is connected through resistance 316 and an alarm relay 312 to negative, so that operation of spring 425 causes relay 312 to operate. Operation of relay 312 opens spring 363 from its break contact without effect at the moment. Operation of this relay also closes springs 364 and 365 against their respective make contacts, thereby closing parallel circuits the first of which extends from positive through spring 364 and its make contact, condenser 318, through resistance 319 to negative. The second parallel path extends from positive through spring 365 and its make contact, through the winding of relay 313, through resistance 319 to negative.

Condenser 318 has a capacity of approximately sixty (60) microfarads, and resistance 319 has a value of 1,000 ohms. Relay 313 is a high inductance relay having resistance of 3,400 ohms, and as a result this relay receives insufficient current to permit it to operate during the period that charging current is flowing into the condenser 318. Resistance 319 limits the rate of flow of this charging current, with the result that appreciable time is required before the condenser becomes fully charged. In normal operation, the operated B relay, assumed to be 402, will be restored before condenser 318 becomes fully charged; however, should the BM acknowledging circuit be not completed, for example, by the inclusion of a dirty contact therein, relay 402 will remain operated long enough to permit condenser 318 to become fully charged, at the end of which time relay 313 can receive sufficient current to enable it to operate.

Operation of relay 313 closes a circuit from positive through spring 366 and its make contact, conductor 383, through the winding of alarm cut-out relay 410 to negative, causing that relay to operate. At spring 477, relay 410 opens the previously traced circuit over which slave relay 406 was operated, thereby preventing operation of that relay so long as relay 410 remains operated. At spring 478, relay 410 removes positive from conductor 481, thereby to prevent the operation of slave relay 205 in the RAM. Further operation of the $2.00 channel is thus prevented so long as the trouble remains uncleared in the big money channel, and loss of transfers from the $2.00 register to the $10.00 register is thus prevented.

Upon correction of the trouble and return to normal operation of the big money channel, relay 402 will be restored by the completion of the big money acknowledging circuit under the assumed conditions; whereupon, the circuit of relay 312 will be opened and that relay will restore and open the circuit of relay 313, which likewise restores and opens the circuit of the alarm relay 410, restoring that relay, thereby to restore the $2.00 channel to operation. Restoration of relay 312 closes spring 363 against its break contact, thereby short-circuiting condenser 318 through resistance 317 to dissipate the charge stored in the condenser, thereby returning it to normal in readiness for the next operation.

In case trouble develops in the $2.00 channel, it is not necessary to halt operation of the BM channel since there will be no transfers into it from the $2.00 channel. It will be noted that the 2B relay 401 in the TAM carries a spring 422 closed against its make contact by an operation of the relay. This extends a circuit from positive through the associated lamp to negative, to light that lamp. Positive is also placed on terminal 422A to which is connected a conductor leading to a $2.00 alarm relay combination similar in function to relays 312 and 313. The $2.00 alarm relays have been omitted from the drawings to avoid an unnecessary complication thereof. Since a $2.00 alarm affects only the $2.00 channel, details thereof are not necessary to a complete understanding of this invention.

*Transfer From the Switch 10R to the Switch 50R*

Switch 10R is arranged to transfer to switch 50R for each $50.00 registered in switch 10R. This transfer is effected through the A wiper of switch 10R. It will be noted that the fourth contact in the bank engaged by the A wiper, and the ninth contact in this bank, are connected together and to conductor 553. When the A wiper engages contact number four, $40.00 will be registered in the switch, and transfer is necessary upon the next operation of the switch. When the A wiper is in engagement with the ninth contact in its bank, $90.00 will be registered in the switch, and transfer again becomes necessary.

The magnet 501 of switch 10R is operated over a circuit completed either by operation of the $10.00 slave relay 408 and consequent closing of spring 450 against its make contact, or through the operation of transfer relay 412 and consequent closing of its spring 466 against its make contact.

Assume first that with the wiper A engaging the fourth contact in its bank, the $10.00 slave relay 408 is operated to initiate a fifth operation of the switch. A circuit may be traced from positive through wiper A and its fourth bank contact, conductor 553, through spring 453 and its make contact, conductor 497, conductor 544, through the winding of magnet 502 of switch 50R to negative. Magnet 502 operates over this circuit preparatory to advancing its wipers one step and upon restoration of the relay 408, magnet 502 restores and the registration is thus completed.

In the event that the operation of magnet 501 is effected through a transfer, operation of relay 412 closes spring 453A against its make contact, thereby extending the previously traced circuit through conductor 553 to conductor 497, to operate the magnet 502. Transfer of $50.00 from the switch 10R to the switch 50R is thus accomplished.

*Transfer From the Switch 50R to the Switch THR*

Values are accumulated in the switch 50R without transfer until that switch has taken nineteen steps, at which time $950.00 will be registered therein. At this time, the A wiper of switch 50R will be engaged with its nineteenth contact, and upon the next operation of magnet 502, preparatory to registering an additional $50.00 in switch 50R, transfer becomes necessary. Assume first that magnet 502 is operated by an operation of the $50.00 slave relay 409 to effect this registration. Relay 409 closes spring 456A against its make contact, extending positive over conductor 554 through wiper A of switch 50R and the nineteenth bank contact engaged thereby, through spring 531 and its break contact, spring 533 and its break contact, conductor 555, through the winding of magnet 503 of the switch THR to negative. Magnet 502 is also operated through spring 456 and its make contact as before. Upon restoration of slave relay 409, the circuits of magnets 502 and 503 are opened and those magnets restored to advance their respective wipers one step to complete the transfer.

With wiper A of switch 50R engaging its nineteenth contact, and the wipers of 10R engaging their fourth or ninth contacts, transfer from the switch 10R to the switch 50R, and transfer from the switch 50R to the switch THR, both become necessary. Under these circumstances, magnet 501 of switch 10R may be operated over the previously traced circuit through springs 453 if registration is to be effected by the $10.00 slave relay 408, as before. Operation of relay 408 also closes spring 452A, extending circuit from positive through that spring and its make contact, conductor 556, through the B wiper of the switch 10R and its fourth or ninth contacts, conductor 554, and thence over the previously traced circuit through the A wiper of switch 50R to the magnet 503. Under these circumstances, magnets 501, 502 and 503 are all operated preparatory to advancing their respective wipers one step as the magnets restore.

In the event that switch 10R is to be operated because of a transfer from the switches 5R and 2R, transfer relay 412 will be operated and a circuit will be extended from positive through spring 469A to conductor 556, thence over the previously traced circuit to magnet 503, operating that magnet preparatory to advancing switch THR one step.

The circuit of magnet 503, as well as the circuit of magnet 502 being now completed through the operation of relay 412, an auxiliary holding circuit for relay 412 is brought into play to insure that that relay remains operated until magnets 502 and 503 are fully operated. To this end, the positive on conductor 544 that operates magnet 502 is extended through diode 502A through spring 515 and its break contact to conductor 557, through spring 465 and its make contact, to the winding of relay 412, holding that relay operated until spring 515 opens. In a similar manner, the positive on conductor 555 that operates magnet 503 is extended through diode 503A, through spring 522 and its break contact, to conductor 557 and thence over the just traced circuit to relay 412, this latter circuit being maintained until magnet 503 is fully operated and spring 522 moved out of engagement with its break contact. Thus it will be seen that transfer into switch 10R, into switch 50R, and into switch THR, occurring simultaneously through the operation of relay 412, is completed, even though previously traced holding circuits for relay 412 may have been opened before magnets 502 and 503 have both become fully operated.

*Transfer From Switch THR to Switch TTHR*

Since each step of switch THR denotes the registration of $1,000.00 in that switch, transfer to the ten thousands switch TTHR is necessary upon every tenth registration in switch THR. This is accomplished through the B wiper of switch THR, and when that wiper is in engagement with the ninth contact in its bank and the A wiper of switch 50R is in engagement with the nineteenth contact of its bank, transfer must occur upon operation of magnet of switch 50R to register another $50.00 therein.

The previously traced circuit from the nineteenth contact of the bank engaged by wiper A of the switch 50R, through spring 531 and its break contact, is extended over conductor 558 through the B wiper of switch THR and its ninth bank contact, through the winding of magnet 504 to negative, operating that magnet preparatory to advancing switch TTHR one step. Should this operation be occasioned by an operation of transfer relay 412 as explained before, the positive extended to magnet 504 is extended through diode 504A, through spring 526 and its break contact, to conductor 557, thereby to insure that relay 412 will be maintained until the magnets of all the switches involved have been fully operated.

*Registering the Sale of Combine Tickets*

The system of the present invention is designed to register the issuance of combine tickets of four values. In FIG. 14, there is shown the first of several combine TIM's in each of the four groups. The first of these machines issues $4.00 tickets that designate $2.00 on a runner to win and $2.00 on the same runner to place. The $6.00 ticket machine, in addition to the win and place designation, also designates $2.00 on the same runner to shown. The $10.00 combine TIM designates $5.00 on a runner to win and $5.00 on that same runner to place, and the $15.00 combine TIM adds thereto $5.00 on that runner to show.

The combine TIM's are connected through a combine collector to combine unit. This collector, shown in FIG. 14, duplicates the collector shown more completely in FIG. 3, except that a smaller number of pairs of relays are provided since the number of combine TIM's needed is not as great as the number of $2.00 TIM's. The combine collector is equipped with a reflex relay and, as shown, handles the $4.00 and $10.00 TIM's through its main chain, and the $6.00 and $15.00 TIM's through its reflex chain. This specific arrangement may be altered within the teachings of the invention, if desired.

*Issuing a $4.00 Combine Ticket on Runner Number One*

Runner number one key 1429 in the $4.00 TIM is depressed and locked in operated position, and through this operation spring 1430 is closed against its make contact. A circuit is thus extended from positive through spring 1430 and its make contact, through spring 1432 and its break contact, through the collector start relay 1401 to negative, operating that relay. A circuit may now be traced from positive on spring 1041, conductor 1050, spring 1111 and its break contact, spring 1119 and its break contact, spring 1128 and its break contact, spring 1136 and its break contact, conductor 1150, through spring 1410 and its make contact, to the collector start chain. When its turn is reached, collector relay 1402 will be operated in the manner described in connection with relay 302 of the $2.00 collector. A circuit may now be traced from negative through the number one relay 905 of the combine unit, conductor 930, spring 1429 and its make contact, through the winding of TIM acceptance relay 1407, through spring 1431 and its break contact, spring 1412 and its make contact, spring 1416 and its break contact, thence through similar break contacts on the other collector relays, spring 1425 and its break contact, spring 1420 and its break contact, conductor 1450, through the winding of 4B relay 1101 in the combine unit, conductor 1151, through resistance 1109 to positive. Relays 905 and 1101 operate over this circuit, but the inclusion of resistance 1109 therein prevents sufficient flow of current therein to operate acceptance relay 1407 at the moment.

Operation of relay 1101 closes a circuit from positive, through spring 1110 and its make contact, through the winding of the $4.00 slave relay 1102 to negative, operating that relay. At spring 1111, relay 1101 opens the previously traced circuit of the start chain of the combine collector to stop that collector. Operation of relay 1101 closes a circuit from positive through spring 1112 and its make contact, conductor 1008, through combine slave relay 1007 to negative, operating that relay.

Operation of relay 905 closes a circuit from positive through spring 922 and its make contact, through the winding of runner number one slave relay 906 to negative, operating that relay.

A circuit may now be traced from positive on spring 1011 and its make contact, spring 1019 and its break contact, conductor 1051, spring 1114 and its make contact, conductor 1052, to start relay 303 in the $2.00 win collector to negative, operating that relay. When its turn is reached, collector relay 304 operates in the previously explained manner. A circuit may now be traced from negative through 2B relay 207 in the number one RAM of the win pool, conductor 250, spring 910 and its make contact, conductor 931, through spring 1017 and its break contact, through the $2.00 win acceptance relay 1001 in the combine unit, conductor 1053, spring 1113 and its make contact, conductor 1054, through spring 336 and its make contact, spring 344 and its break contact, spring 359 and its break contact, spring 357 and its break contact, conductor 376, through the winding of the 2B relay 401 in the win TAM, through resistance 476 to positive. Relays 207 and 401 operate over this circuit, but the inclusion of resistance 476 therein prevents acceptance relay 1001 from operating at the moment. Operation of relays 207 and 401 effect registration of the $2.00 in the win TAM and runner number one RAM in the hereinbefore described manner.

Operation of relays 906 and 1101 also closes a circuit which may be traced from positive, spring 1013 and its make contact, spring 1027 and its break contact, conductor 1055, spring 1116 and its make contact, conductor 1056 to the start chain in the $2.00 place collector to a start relay in the place collector associated with the operated $4.00 combine TIM. In FIG. 12, the collector is skeletonized to avoid unnecessary repetition in the drawing. When its turn is reached, the collector relay associated with the operated collector start relay is operated and contact 1210 closed thereby.

A circuit may now be traced from negative through the 2B relay 901 in the RAM number one in the place pool, spring 912 and its make contact, conductor 932, spring 1025 and its break contact, through the upper winding of $2.00 place acceptance relay 1003 of the combine unit, conductor 933, spring 1115 and its make contact, conductor 934, spring 1210 and its make contact, through the winding of the 2B relay 1201 in the place pool TAM, resistance 1206, to positive. Relays 901 and 1201 operate over this circuit, but the inclusion of resistance 1206 therein, prevents operation of relay 1003 at the moment.

In the win pool, when the registration is complete, the acknowledging circuit is extended to short-circuit resistance 476 in the hereinbefore described manner, thereby to increase the current flow in the circuit through relay 1001 sufficiently to cause that relay to operate and close a holding circuit for itself that may be traced from positive through spring 1010 and its make contact and 1018 and its make contact, through the lower winding of the relay to negative. At spring 1017, relay 1001 opens the circuit over which relays 207 and 401 were operated, restoring those relays to complete the registration of $2.00 in the win pool. In the place pool, upon completion of the $2.00 acknowledging circuit which duplicates that of the win pool, positive is applied to terminal 1207, thereby short-circuiting resistance 1206 and increasing the flow of current in the circuit through relay 1003 sufficiently to cause that relay to operate and close a holding circuit for itself which may be traced from positive through spring 1012 and its make contact, spring 1026 and its make contact, through the lower winding of relay 1003 to negative. Operation of relay 1003 at springs 1025 opens the circuit of relays 901 and 1201, causing those relays to restore to complete the registration of $2.00 in the place pool.

Relays 1001 and 1003 now both being operated, the combine acknowledging circuit may now be traced from positive through spring 1117 and its make contact, conductor 1152, through spring 1028 and its make contact, spring 1020 and its make contact, spring 1016 and its make contact, conductor 1151, to the junction of the winding of 1101 and resistance 1109. Positive thus being applied to both terminals of 1109, short-circuits that resistance and increases the flow of current through relay 1407 sufficiently to cause that relay to operate and thereby initiate the cycle of the $4.00 combine TIM to print and issue the ticket.

Operation of relay 1407 also opens spring 1431 thereby to open the circuit over which relays 1101 and 905 were operated, causing those relays and their associated slave relays 1102 and 906 respectively, to restore. At spring 1432, relay 1407 opens the circuit of collector start relay 1401 to restore that relay. At the end of the cycle of the TIM, springs 1429 and 1430 are opened in the usual manner to restore the equipment to normal.

*Registering the Sale of a $6.00 Combine on Runner Number One*

To do this, key 1433 in the $6.00 combine TIM is operated and with it spring 1434 closed against its make contact to extend a circuit from positive through spring 1436 and its break contact to collector start relay 1401. When its turn is reached, collector relay 1402 operates as before and reflex relay 1406 also operates. A circuit may now be traced from negative through relay 905 and over the previously traced circuit to conductor 930, spring 1433 and its make contact, through the winding of acceptance relay 1408 of the $6.00 TIM, spring 1435 and its break contact, spring 1413 and its make contact, spring 1417 and its break contact, thence over the chain to spring 1421 and its break contact, spring 1426 and its make contact, conductor 1451, through the winding of $6.00 B relay 1103 of the combine unit to positive on conductor 1151 through resistance 1109. Relays 905 and 1103 operate over this circuit, relay 905 closing the previously traced circuit for its slave relay 906 and relay 1103 closing a circuit from positive through spring 1118 and its make contact, through the $6.00 slave relay 1104 of the combine unit to negative, operating that relay. At spring 1120 and its make contact, relay 1103 applies positive to conductor 1008 to operate relay 1007 as before. At spring 1119, relay 1103 opens the start circuit of the combine collector to stop that collector as before.

Operation of relay 1104 closes the circuit of start relay 303 in the $2.00 win pool collector as previously traced, except that conductor 1051 is connected to conductor 1052 through spring 1122 instead of spring 1114.

Operation of relays 906 and 1104 close the previously traced circuit through the $2.00 win acceptance relay 1001, except that the connection between conductors 1053 and 1054 is through spring 1121 and its make contact, instead of through spring 1113. Thus the previously described operation of registering $2.00 in the win pool is repeated.

Operation of relay 1104 closes the start circuit of the place collector as previously traced, except that conductor 1055 is connected to conductor 1056 through spring 1124 and its make contact, instead of through spring 1116.

Operation of relays 906 and 1104 also closes the circuit through $2.00 place acceptance relay 1003, as previously traced, except that the connection between conductors 933 and 934 is now extended through spring 1123 and its make contact, instead of spring 1115, and a registration of $2.00 in the place pool is effected as before.

A third circuit may now be traced from positive on spring 1015 and its make contact, through spring 1035 and its break contact, conductor 1056, spring 1126 and its make contact, conductor 1057, to a start relay in the $2.00 show collector associated with the operated TIM to operate that relay. When its turn is reached, the collector relay associated with that start relay will be operated and springs 1212 closed, and a circuit may now be traced from negative through the 2B relay 903 in the show pool, RAM number one, spring 914 and its make contact, conductor 935, spring 1033 and its break contact, through the upper winding of relay 1005, conductor 1058, spring 1125 and its make contact, conductor 1059, spring 1212 and its make contact, through the winding of 2B relay 1203 of the show pool TAM, resistance 1208, to positive. Relays 903 and 1203 operate over this circuit, but the inclusion of resistance 1208 therein prevents the operation of relay 1005 at the moment. In due course, the $2.00 acknowledging circuit of the show pool will be completed and positive applied to terminal 1209, thereby to short-circuit resistance 1208 and increase the flow of current through relay 1005, causing that relay to operate and close a holding circuit for itself which may be traced from positive through spring 1014 and its make contact, spring 1034 and its make contact, through the lower winding of relay 1005 to negative. Relays 1001, 1003 and 1005 now being operated, the combine acceptance circuit is completed from positive through spring 1036 and its make contact and thence over the previously traced circuit through springs 1028, 1020, and 1016 to conductor 1151, thereby to apply positive to both terminals of resistance 1109 which increases the flow of current through relay 1408 sufficiently to cause that relay to operate and initiate the operation of the cycle of the $6.00 combine TIM. At spring 1435, relay 1408 opens the circuit of 1103 and 905, causing those relays to restore and at springs 1436 open the circuit of relay 1401 to cause that relay to restore and thereby complete the registration of the $6.00 combine with $2.00 in the win pool, $2.00 in the place pool, and $2.00 in the show pool TAM's and $2.00 on the number one RAM's in each of these pools.

*Registering a $10.00 Combine Ticket on Runner Number One*

Operation of key 1437 in the $10.00 combine TIM to select runner number one, closes a circuit from positive through spring 1438 and its make contact, spring 1440, through the winding of combine collector start relay 1403 to negative, operating that relay. When its turn is reached, collector relay 1404 will operate and a circuit may then be traced from negative through runner number one, relay 905, in the combine unit, over the previously traced circuit, to conductor 930, thence through spring 1437 and its make contact, through the winding of TIM acceptance relay 1409 and its break contact, spring 1439 and its break contact, spring 1418 and its make contact, spring 1427 and its break contact, spring 1422 and its break contact, conductor 1452, through the winding of the 10B relay 1105 in the combine unit to positive placed on conductor 1151, through resistance 1109. Relays 905 and 1105 operate over this circuit. Relay 1105, upon operating at spring 1128 opens the previously traced start circuit of the combine collector to stop that collector. At spring 1129 and its make contact, relay 1105 applies positive to conductor 1008, thereby to operate relay 1007 as before. At spring 1127 and its make contact, relay 1105 closes the circuit of its slave relay 1106, operating that relay.

A circuit may now be traced from positive through spring 1011 and its make contact, spring 1023 and its break contact, conductor 1060, through spring 1131 and its make contact, conductor 1061, through the winding of start relay 603 in the BM collector in the win pool to negative, operating that relay. When its turn is reached, collector relay 604 is operated and a circuit may now be traced from negative through BMB relay 206 in the runner number one RAM in the win pool, conductor 257, through spring 911 and its make contact, conductor 940, spring 1021 and its break contact, through the winding of relay 1002, conductor 1062, spring 1130 and its make contact, conductor 1063, spring 637 and its make contact, thence over the previously traced chain to spring 648 and its break contact, spring 644 and its break contact, through conductor 660, through the winding of the 5B relay 402, conductor 484, resistance 485, to positive. Relays 206 and 402 operate over this circuit, but the inclusion of resistance 485 therein prevents the operation of relay 1002 at the moment.

Operation of relays 206 and 401 initiates a $5.00 registration in the TAM and runner number one RAM in the win pool in the hereinbefore explained manner. Upon completion of the BM acknowledging circuit of the win pool, resistance 485 is short-circuited as before, and a current flowing through relay 1002 increases sufficiently to cause that relay to operate and close a holding circuit for itself traceable from positive through spring 1010 and its make contact, spring 1022 and its make contact, through the lower winding of relay 1002 to negative. At spring 1021, relay 1002 opens the circuit over which relays 206 and 402 were operated to restore those relays. At spring 1023, relay 1002 opens the previously traced circuit of start relay 603 to restore that relay.

Operation of relay 1106 also closes a circuit which may be traced from positive through spring 1013 and its make contact, spring 1031 and its break contact, conductor 1064, through spring 1133 and its make contact, conductor 1065, to the start relay in the BM place collector associated with the $10.00 combine TIM, to operate that relay. When its turn is reached, the associated collector relay operates and closes spring 1211. A circuit may now be traced from negative through BMB relay 902 in place pool RAM number one, spring 913 and its make contact, conductor 941, spring 1029 and its break contact, through the winding of combine unit $5.00 place acceptance relay 1004, conductor 1066, spring 1132 and its make contact, conductor 1067, spring 1211 and its make contact, through the winding of the 5B relay 1202 in the place TAM, resistance 1225 to positive. Relays 902 and 1202 operate over this circuit, but the inclusion of resistance 1225 prevents the operation of relay 1004 at the moment.

Operation of relays 902 and 1202 effect registration of a $5.00 bet in the place TAM and in the runner number one RAM in the place pool. In due course, the place pool BM acknowledging circuit is closed and positive applied to terminal 1226, thereby to short-circuit resistance 1225 to increase the flow of current through 1004 and operate that relay. Relay 1004 closes a holding circuit for itself which may be traced from positive through spring 1012 and its make contact, spring 1030 and its make contact, through the lower winding of the relay to negative. At spring 1031, relay 1004 opens the previously traced start circuit of the BM place collector to restore that collector, and at spring 1025 opens the circuit of relays 902 and 1202 to restore those relays and thereby complete registration of the value of the place pool.

Relays 1002 and 1004 now being operated, the combine unit acknowledging circuit may be traced from positive through spring 1134 and its make contact, conductor 1065, spring 1032 and its make contact, spring 1024 and its make contact, spring 1016 and its make contact, conductor 1151, to the junction of relay 1105 and resistance 1109, thereby short-circuiting this resistance and increasing the current flowing through acceptance relay 1409 sufficiently to operate that relay. Relay 1409 initiates a cycle of the TIM, and at spring 1439 opens the circuit over which relays 905 and 1105 were operated to restore those relays. At spring 1440, relay 1409 opens the circuit of combine collector start relay 1403 to restore that relay.

*Registration of a $15.00 Combine Ticket on Runner Number One*

Operation of key 1441 in the $15.00 combine TIM closes a circuit from spring 1442 and its make contact, spring 1444 and its break contact, through the winding of combine collector start relay 1403 to negative, operating that relay. When its turn is reached, collector relay 1404 will be operated and reflex relay 1406 will likewise be operated. A circuit may then be traced from runner number one relay 905, conductor 930, through spring 1441 and its make contact, through the winding of relay 1410, spring 1443 and its break contact, through spring 1419 and its make contact, spring 1423 and its break contact, spring 1428 and its make contact, conductor 1453, through the winding of the 15B relay 1107, conductor 1151 and resistance 1109 to positive. Relays 1107 and 905 operate over this circuit, but the inclusion of resistance 1109 therein prevents the operation of relay 1410 at the moment.

Operation of relay 905 closes the circuit for its slave relay 906, as before. Operation of relay 1107 at spring 1136 opens the previously traced start circuit of the combine collector to stop that collector. At spring 1135, relay 1107 closes the circuit of its slave relay 1108 to negative, operating that relay.

The circuit of relay 603 in the BM collector in the win pool is now closed, as previously traced, except that conductor 1060 is connected to conductor 1061, through spring 1139 and its make contact, instead of springs 1131. The circuit of the BM relay 206 and 5B relay 402 is closed, as previously traced, except that conductor 1062 is connected to conductor 1063, through spring 1138 and its make contact, instead of springs 1130. Registration of $5.00 in the win pool is effected as before.

The start circuit of the BM collector in the place pool is closed as previously traced, except that conductor 1064 is now connected to conductor 1065, through spring 1141 and its make contact, instead of springs 1133.

The circuit of the BMB relay 902 and 5B relay 1202 is closed, as previously traced, except that conductor 1066 is connected to conductor 1067 through spring 1140 and its make contact, instead of springs 1132, and registration of $5.00 in the place pool is effected as before.

A third circuit may now be traced from positive through spring 1015 and its make contact, spring 1039 and its break contact, conductor 1068, through spring 1143 and its make contact, conductor 1069, through the start relay in the BM show collector associated with the $15.00 combine TIM, to negative operating that relay.

In due course, the associated collector relay will operate and close springs 1213. A circuit may now be traced from negative through the BMB relay 904 in the show pool RAM number one, spring 915 and its make contact, conductor 942, spring 1037 and its break contact, through the upper winding of the $5.00 show acceptance relay 1006, conductor 1070, spring 1142 and its make contact, conductor 1071, spring 1213 and its make contact, through the 5B relay 1204 of the show pool TAM and resistance 1227 to positive. Relays 904 and 1204 operate over this circuit, but the inclusion of resistance 1227 therein prevents operation of relay 1006 at the moment.

Registration of $5.00 in the show pool TAM and selected show pool RAM is thus initiated and in due course positive is applied to terminal 1228 to short-circuit resistance 1227 and thereby increase the current flow through relay 1006 sufficiently to cause that relay to operate.

Relay 1006 closes a holding circuit for itself traceable from positive through spring 1014 and its make contact, spring 1038 and its make contact, through the lower winding of the relay to negative, and at spring 1037 opens the circuit of relays 904 and 1204, permitting those relays to restore and at spring 1039 opens the start circuit of the BM show collector, permitting that collector to restore.

Relays 1002, 1004 and 1006 now being operated, the combine acknowledging circuit may be traced from positive through spring 1040 and its make contact, thence over the previously traced circuit through the respective make contacts of springs 1032, 1024 and 1016, to conductor 1151, thereby to apply positive to both terminals of resistance 1109, short-circuiting that resistance to increase the flow of current through relay 1410 sufficiently to cause that relay to operate and initiate a cycle of the $15.00 TIM. At springs 1443 relay 1410 opens the circuit over which relays 905 and 1107 were operated, thereby to restore those relays, and at spring 1444, relay 1410 opens the circuit of BM collector start relay 1403 to permit that relay to restore and thereby restore the combine unit to normal.

*Indication of Dollar Values Registered in the System*

The totalisator of the present invention is oftentimes used in connection with indicator boards, usually referred to as "infield boards," upon which are displayed the dollar value of the sum registered in the TAM and the sums registered in the various RAM's in each pool at the moment. Thus the patrons of the track are apprised of the values in the various pools and upon each runner therein. The indicators shown are of known type, consisting of banks of lamps, each bank containing 24 lamps which are lighted in various combinations to indicate a digit. The lamps are controlled by five relays, two of which must be operated to effect an indication. The five relays of each digit are controlled directly from the banks of the corresponding register switch.

At regular intervals, usually 90 seconds, the timer, FIG. 12, operates to erase the indication then showing and to reset the indicators to indicate the values then registered in the TAM and RAM's.

As shown, the timer rotates cams A and B in the direction indicated by the arrows. The dwell on cam A operates springs 1224 and 1225 to move them out of engagement with their respective break contacts. As will be seen in FIG. 4, operation of spring 1224 out of engagement with its break contact removes positive from spring 420 and hence from start conductor 375 of the $2.00 collector to stop operations over the $2.00 channel. Spring 1225 removes positive from the chain of contacts leading to start conductor 483 of the BM collector thereby to stop operations over the BM channel.

A moment after operations have thus been stopped over both chains, cam B moves spring 1216 out of engagement with its break contact and into engagement with its make contact. Positive is thus removed from conductor 1221A to release the operated indicator relays and thereby erase the values then indicated. Application of positive to the make contact of spring 1216 applies positive to conductor 1222 which is connected to conductors 730 and 731, FIG. 7. A circuit is thus extended to relays 704 and 801, operating those relays. Conductor 1222 also extends a circuit to the indicator relays in each RAM which, such as relay 208, FIG. 2, operates those relays.

Cam B maintains spring 1216 in engagement with its make contact for a short interval, usually about one second, during which interval the indicators are reset to show the new values and at the end of which spring 1216 reapplies positive to conductor 1221A to maintain that indication.

Cam A then restores springs 1224 and 1225 into engagement with their respective break contacts thereby to restore positive on collector start conductors 375 and 483 so that operations may be resumed over both channels.

In the drawings the equipment in the win pool is shown. The place and show pools, indicated diagrammatically in FIG. 12, duplicate the win pool equipment and the timer extends circuits to these pools so that indications of the values registered therein are changed simultaneously with the win pool indications.

Indication of the units digit of the sum registered in the TAM is controlled jointly by the switches 5R and 2R. Operation of relay 704 applies positive to wipers E and F through springs 714 and 713, respectively. If there are odd numbers of $5.00 registrations in switch 5R, the wipers thereof will be engaged with an odd-numbered contact in their respective banks. Under these circumstances, wiper E of switch 5R is connected to wiper C of switch 2R and wiper F of switch 5R is connected to wiper D of switch 2R. The units digit to be indicated will thus be $5.00 plus $2.00 for each step that the switch 2R has taken. Under these circumstances, circuits will be completed according to the following table, to indicate the digit values shown:

5R ON ODD-NUMBERED CONTACTS

| 2R on Contacts | Wiper C of 2R Closes Circuit to Relay | Wiper D of 2R Closes Circuit to Relay | Units Digit Displayed |
|---|---|---|---|
| 1 | 1 | 3 | 7 |
| 2 | 2 | 4 | 9 |
| 3 | 1 | 5 | 1 |
| 4 | 2 | 3 | 3 |
| 5 | 2 | 5 | 5 |
| 6 | 1 | 3 | 7 |
| 7 | 2 | 4 | 9 |
| 8 | 1 | 5 | 1 |
| 9 | 2 | 3 | 3 |
| 10 | 2 | 5 | 5 |

When switch 5R is in its home position, or has taken an even number of steps therefrom, indicating zero, or an even number of $5.00 transactions registered in the switch, its wiper E will be connected to wiper E of the 2R switch, and its wiper F to the F wiper thereof. Unit digit indication will then consist of zero from the register 5R plus $2.00 for each step switch 2R has taken, and the indication will be as follows:

5R ON EVEN-NUMBERED CONTACTS

| 2R on Contacts | Wiper E of 2R Closes Circuit to Relay | Wiper F of 2R Closes Circuit to Relay | Units Digit Displayed |
|---|---|---|---|
| 1 | 3 | 5 | 2 |
| 2 | 1 | 2 | 4 |
| 3 | 1 | 4 | 6 |
| 4 | 5 | 4 | 8 |
| 5 | 3 | 4 | 0 |
| 6 | 3 | 5 | 2 |
| 7 | 1 | 2 | 4 |
| 8 | 1 | 4 | 6 |
| 9 | 5 | 4 | 8 |
| 10 | 3 | 4 | 0 |

The tens digit of the sum to be indicated is controlled jointly through wipers B and C of the switch 50R, and wipers C, D, E and F of the switch 10R. The tens indication is accomplished as follows:

With switch 50R on an odd-numbered contact denoting an odd number of $50.00 registrations therein, B wiper on 50R connects to C wiper on 10R, and C wiper on 50R connects to D wiper on 10R.

Tens digit indications are then controlled as follows:

| SW 10R on Contacts | C Wiper Closes Circuit to Relay | D Wiper Closes Circuit to Relay | Tens Digit Displayed |
|---|---|---|---|
| 1 | 1 | 4 | 6 |
| 2 | 1 | 3 | 7 |
| 3 | 5 | 4 | 8 |
| 4 | 2 | 4 | 9 |

With 10R on 4, transfer occurs on next step and indication control is transferred and B wiper on 50R connects to E wiper on 10R, and C wiper on 50R connects to F wiper on 10R, and indication continues:

| SW 10R on Contacts | E Wiper Closes Circuit to Relay | F Wiper Closes Circuit to Relay | Tens Digit Displayed |
|---|---|---|---|
| 5 | 3 | 4 | 0 |
| 6 | 1 | 5 | 1 |
| 7 | 3 | 5 | 2 |
| 8 | 3 | 2 | 3 |
| 9 | 1 | 2 | 4 |

Transfer again occurs as 10R moves into its tenth step position and indication reverts to wipers C and D on 10R.

| 10R on Contact | C Wiper Closes Circuit to Relay | D Wiper Closes Circuit to Relay | Tens Digit Displayed |
|---|---|---|---|
| 10 | 2 | 5 | 5 |

With 50R on even-numbered contacts denoting an even number of $50.00 registrations therein, B wiper on 50R connects to E wiper on 10R, and C wiper on 50R connects to F wiper on 10R.
Then with:

| 10R on Contacts | E Wiper Closes Circuit to Relay | F Wiper Closes Circuit to Relay | Tens Digit Displayed |
|---|---|---|---|
| 1 | 1 | 5 | 1 |
| 2 | 3 | 5 | 2 |
| 3 | 3 | 2 | 3 |
| 4 | 1 | 2 | 4 | transfer occurs on next step of 10R and indication control shifts to wiper C and D of 10R:

| 10R on Contacts | C Wiper Closes Circuit to Relay | D Wiper Closes Circuit to Relay | Tens Digit Displayed |
|---|---|---|---|
| 5 | 2 | 5 | 5 |
| 6 | 1 | 4 | 6 |
| 7 | 1 | 3 | 7 |
| 8 | 5 | 4 | 8 |
| 9 | 2 | 4 | 9 |

Transfer again occurs and indication control reverts to wipers E and F of 10R:

| 10R on Contact | E Wiper Closes Circuit to Relay | F Wiper Closes Circuit to Relay | Tens Digit Displayed |
|---|---|---|---|
| 10 | 3 | 4 | 0 |

The hundreds digit indication is controlled through the E and F wipers of the switch 50R, indicator relays being operated to indicate digits in accordance with the following table:

| 50R on Contacts | E Wiper Closes Circuit to Relay | F Wiper Closes Circuit to Relay | Hundreds Digit Displayed |
|---|---|---|---|
| 1 | 3 | 4 | 0 |
| 2 | 1 | 5 | 1 |
| 3 | 1 | 5 | 1 |
| 4 | 3 | 5 | 2 |
| 5 | 3 | 5 | 2 |
| 6 | 3 | 2 | 3 |
| 7 | 3 | 2 | 3 |
| 8 | 1 | 2 | 4 |
| 9 | 1 | 2 | 4 |
| 10 | 5 | 2 | 5 |
| 11 | 5 | 2 | 5 |
| 12 | 1 | 4 | 6 |
| 13 | 1 | 4 | 6 |
| 14 | 1 | 3 | 7 |
| 15 | 1 | 3 | 7 |
| 16 | 5 | 4 | 8 |
| 17 | 5 | 4 | 8 |
| 18 | 2 | 4 | 9 |
| 19 | 2 | 4 | 9 |
| 20 | 3 | 4 | 0 |

Switch 50R takes one step for each $50.00 registered and it will be noted that the hundreds digit indicator is changed on every second step of the switch.

The thousands digit of the sum to be indicated is controlled through the D and E wipers of the THR switch, the indicator relays being operated in accordance with the following table:

| THR on Contacts | D Wiper Closes Circuit to Relay | E Wiper Closes Circuit to Relay | Thousands Digit Displayed |
|---|---|---|---|
| 1 | 1 | 5 | 1 |
| 2 | 3 | 5 | 2 |
| 3 | 3 | 2 | 3 |
| 4 | 1 | 2 | 4 |
| 5 | 5 | 2 | 5 |
| 6 | 1 | 4 | 6 |
| 7 | 1 | 3 | 7 |
| 8 | 5 | 4 | 8 |
| 9 | 2 | 4 | 9 |
| 10 | 3 | 4 | 0 |

The ten thousands digit of the sum to be indicated is controlled through the E and F wipers of the switch TTHR. This switch contains twenty contacts in each of its banks, although only ten contacts are needed for the ten thousand digit indication, contacts 1 and 11, 2 and 12, etc., being multipled together as indicated, and the value of this digit being controlled in accordance with the following table:

| TTHR on Contacts | E Wiper Closes Circuit to Relay | F Wiper Closes Circuit to Relay | Ten Thousands Digit Displayed |
|---|---|---|---|
| 1 or 11 | 1 | 5 | 1 |
| 2 or 12 | 3 | 5 | 2 |
| 3 or 13 | 3 | 2 | 3 |
| 4 or 14 | 1 | 2 | 4 |
| 5 or 15 | 5 | 2 | 5 |
| 6 or 16 | 1 | 4 | 6 |
| 7 or 17 | 1 | 3 | 7 |
| 8 or 18 | 5 | 4 | 8 |
| 9 or 19 | 2 | 4 | 9 |
| 10 or 20 | 3 | 4 | 0 |

The one hundred thousand digit of the value to be indicated is controlled through the C and D wipers of the switch TTHR. It will be noted that these wipers are single-ended wipers, spaced 180° apart, which in effect makes the switch TTHR a 40-point switch. During the first ten steps of switch TTHR, no 100,000 digit appears in the sum to be indicated, and the contacts engaged by wiper C of this switch remain open. With the wiper C engaging contacts 10 to 19, inclusive, of its bank, during each indication cycle positive will be extended to the first and fifth conductors leading into the 100,000 indicator, thereby to operate the first and fifth relays therein to set that indicator to indicate digit 1. During the second ten steps, wiper D engages contacts 1 to 9 in its bank. During each indication cycle, positive will be placed upon conductors 3 and 5 to set the 100,000 indicator to indicate digit 2. When wiper D engages contacts 10 to 19 in its bank, positive is placed upon conductors 2 and 3 to set the 100,000 indicator to indicate digit 3. Thus a maximum of $300,000.00, plus the indication of the lower value digits, is the most that can be registered and indicated in the system shown.

In FIG. 16, there is shown a diagram of the position of each of the twenty-four (24) lamps constituting an indicator for a single digit. In FIG. 13, the five relays by which the tens digit is controlled are shown, together with the circuits by which appropriate lamps are lighted in accordance with the code indicated in FIG. 15 to form the various digits. The details of this arrangement are well known to those skilled in the art, having been shown and described in the Johnston Patent 2,563,041, issued August 7, 1951, to which patent reference is here made for those details. It is sufficient to note herein that the digits are formed by operation of the relay specified and consequent lighting of the lamp specified in the following table:

| Digit | Relays | Lamps |
| --- | --- | --- |
| 0 | 3 and 4 | 2. 3. 8. 12. 16. 20. 23. 22. 17. 13. 9. 5. |
| 1 | 1 and 5 | 3. 7. 11. 15. 19. 23. |
| 2 | 3 and 5 | 5. 2. 3. 8. 11. 14. 17. 21. 22. 23. 24. |
| 3 | 2 and 3 | 1. 2. 3. 4. 8. 11. 16. 20. 23. 22. 17. |
| 4 | 1 and 2 | 3. 7. 11. 15. 19. 23. 16. 14. 13. 9. 6. |
| 5 | 2 and 5 | 4. 3. 2. 1. 5. 9. 10. 11. 16. 20. 23. 22. 17. |
| 6 | 1 and 4 | 3. 2. 5. 9. 13. 17. 22. 23. 20. 16. 11. 10. |
| 7 | 1 and 3 | 1. 2. 3. 4. 8. 11. 14. 17. 21. |
| 8 | 4 and 5 | 2. 3. 8. 11. 16. 20. 23. 22. 17. 13. 10. 5. |
| 9 | 2 and 4 | 2. 3. 8. 11. 12. 16. 20. 23. 22. 10. 5. |

The switch bank and wiper arrangements in the TAM, and the indicators associated therewith, are duplicated in each RAM, and during an indication cycle each RAM indication is changed simultaneously with the changing of the TAM indication.

*Special Indication*

Some racetracks are not equipepd with infield boards upon which are displayed the dollar value of the sums registered in each pool and the individual runners therein, but rather these tracks display only the probable odds in the win pool. To permit use of the totalisator system of the present invention at a track of this kind, special indication arrangements are provided.

In the computing room of the track is a miniature indicator 1230 having a 5-relay combination for each digit, the same as the infield board indicators previously described. In the drawings, only the units digit indicator of the miniature indicator is shown, to avoid an unnecessary complication of the drawing. Also, in the computing room, is a miniature indicator selector key box 1231 containing a key for the TAM and each RAM in the win pool. When it is desired to set up on the miniature indicators the sum registered in the win pool TAM, the operation is as follows.

Key 1232, associated with the TAM, is depressed and places positive on conductor 1233, thereby closing a circuit through relay 705 to negative, and through relay 1205 to negative, and relays 1301 and 1302 to negative, operating those relays.

Relay 705 closes springs 717 against its make contact thereby closing a circuit from positive through spring 718 and its break contact, spring 536 and its break contact, spring 719 and its make contact, to conductor 1235, and thence through indication slave relay 414 and resistance 1223 to negative. If at the moment none of the slave relays in the TAM are operated, relay 414 operates and closes circuits of indication relays 704 and 801, by placing positive on conductors 730 and 731 to operate those relays. Positive is thus placed on the indication leads and extended through proper ones of springs 1217 to 1221, inclusive, to operate the relays in the miniature indicator 1230 in the hereinbefore described manner. Operation of these miniature relays extends this positive to conductor 1234, thereby extending a circuit through the winding of relay 706 to negative, operating that relay. At spring 718, relay 706 opens the circuit previously closed to relay 414, permitting that relay to restore and thereby restore the TAM to normal operation. Spring 718 moving into engagement with its make contact extends positive from spring 717 and its make contact to conductor 1234, thereby to maintain operated the operated relays in the miniature indicator 1230, notwithstanding that the circuits over which these relays were energized are opened by the restoration of relay 414. So long as key 1232 is maintained operated, the indication of the value of the sum registered in the TAM will be maintained on the miniature indicators.

It will be noted that spring 536 is a spring on the $100.00 slave relay 505 of the TAM, this spring being shown detached from its relay to permit simplification of the drawings. Thus should relay 505 be operated at the moment when key 1232 is operated, the above traced circuit to relay 414 is not closed until relay 505 restores. The sum thus registered in the TAM being noted, key 1232 is released to restore the indicator to normal, and key 1235 may be operated to select RAM number one.

Each of the RAM's contains a relay similar to 705, and upon operation of key 1237 such relay is operated over a circuit duplicating that of relay 705, and closed by movement of key 1237 into engagement with its make contact. Positive is thus applied by springs corresponding to 717 of the circuit previously traced, through springs 718 and 536, and thence over conductor 1236 leading to the RAM's, and in RAM number one a spring corresponding to 719 will be closed against its make contact to extend a circuit to the indication slave relay of the RAM. Conductor 1234 is multiplied to all RAM's, so that upon operation of the indicator relays and consequent placing of positive on this conductor, a relay in the RAM corresponding to 706 is operated and positive thereby placed upon conductor 1234 to hold the operated miniature indicator relays in operated position so long as key 1237 remains operated. The sum registered on runner number one thus being indicated, the odds can be computed and displayed in known manner.

The foregoing operation is repeated until the probable odds on all runners are indicated. In view of the time consumed in computing the odds, and due to the fact that the sum registered in the TAM is constantly changing, frequently at a rapid rate, the calculators may recheck the value registered in the TAM between successive checking of the RAM values, so that the probable odds indicated will be as accurate as possible.

*Reset*

In the drawings the various switches are shown in their normal or home position. At the end of a race, it is necessary to return these switches to their home position in preparation for registrations of sales in the succeeding race. To this end, key 473 is operated to extend a circuit from positive through reset relay 413 in the TAM and corresponding relays in the RAM's. Key 473 is shown in juxtaposition to the win pool TAM for convenience of illustration; however, this key or its equivalent will ordinarily be located on the control panel of the system and upon being operated will extend reset circuits to all TAM's and RAM's in the system, either directly as shown or through suitable relays.

Operation of relay 413 closes spring 474 against its make contact, thereby placing positive upon the A wiper of switch 5R. It will be noted that all of the bank contacts, except the tenth in the bank engaged by the A wiper, are multipled together and connected through spring 710 and its break contact, through the winding of magnet 701 to negative, thereby operating that magnet which opens springs 710, permitting the magnet to restore and step the wipers of switch 5R forward one step. This operation continues in a buzzerlike fashion until wiper A engages its tenth bank contact and comes to rest in its home position.

Operation of relay 414 also closes spring 475 and its make contact, thereby extending a circuit from positive through the A wiper of the switch 2R and the multipled together bank contacts thereof, over conductor 460, through spring 711 and its break contact, through the winding of magnet 702 to negative, operating that magnet which opens its own circuit at spring 711 and operates in buzzerlike fashion to advance the wipers of switch 2R to the home position of the switch.

Operation of relay 413 also closes springs 528 and 529 against their respective make contacts, spring 529 extending the circuit from positive on wiper A of switch 10R, through the first, second, third, fifth, sixth, seventh and eighth contacts of the bank by this wiper, through spring 529 and its make contact, spring 513 and its break contact, thence through the winding of magnet 501 to negative, operating that magnet which opens its own circuit at spring 513 and operates in buzzerlike fashion to advance wiper A into engagement with either the fourth or ninth contact in its bank. The circuit is then closed, through wiper A and one of these contacts, conductor 553, through spring 528 and its make contact, spring 513 and its make contact, through the magnet 501 to negative, operating that magnet. This operation, through springs 528 and 529 continues until wiper A reaches its home position.

Operation of relay 413 also closes springs 530, 531 and 532 against their respective make contacts, and a circuit may be traced from positive on spring 517 through its break contact, spring 530 and its make contact, through the A wiper of switch 50R and the multipled together contacts 1 to 18 therein, spring 532 and its make contact, through the winding of magnet 502 to negative, operating that magnet which opens its own circuit at spring 517. The magnet operates in buzzerlike fashion to advance the switch wipers until contact 19 is engaged, at which time the circuit previously traced to the A wiper extends to spring 531 and its make contact, and thence through magnet 502 to negative, operating that magnet an additional time to advance the wipers into engagement with the twentieth or home position contact of switch 50R.

Operation of relay 413 also closes spring 533 against its make contact, and a circuit may be traced from positive on the A wiper of the switch THR, the multipled together contacts engaged thereby, conductor 560, through spring 535 and its break contact, spring 533 and its make contact, conductor 555, through the magnet 503 to negative, operating that magnet which opens its own circuit at 535. The magnet operates in buzzerlike fashion to advance its wipers to the tenth or home position contacts in their banks.

Operation of relay 413 closes spring 534 against its make contact, thereby closing a circuit from positive through wiper A if the switch has taken less than twenty steps, through the multipled together contacts engaged by wiper B, spring 534 and its make contact, spring 527 and its break contact, through the winding of magnet 504 to negative, operating that magnet, which opens its own circuit at springs 527 and operates in buzzerlike fashion until wiper B is moved into engagement with the multipled together contacts engaged thereby, and until wiper B moves into the twentieth or home position contact of its bank.

Through the foregoing operation, the switches of the TAM are restored to normal in readiness for a next operation and simultaneously the switches in the various RAM's are restored to normal in a similar manner.

*Conclusion*

From the foregoing it will be apparent that the totalisator system of the present invention is capable of being used in conjunction with a substantial number of ticket machines in each pool; that it is a two-channel system capable of accepting transactions over both channels simultaneously. Transfers are made from the lower value registers to the next higher value register when necessary, and provisions are made for preventing loss of such transfers should the higher value register be in operation at the moment transfer becomes necessary.

The adding machines of the present invention are simplified by combining in the total adding machine as much of the control equipment as possible, with the result that the individual runner adding machines, which are more numerous in the system, are simplified and hence less costly to build, transport and maintain.

The system is adapted to be used in conjunction with indicators of known design, those indicators being set by circuits extending directly through the wipers and bank contacts of the register switches and without the intervention of register relays. The system is also adapted for use with miniature indicators at installations where infield boards are not available.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. In a totalisator system, a total adding machine containing two, five, ten, fifty and one hundred unit acceptance relays; a plurality of ticket issuing machines arranged to issue two unit tickets, a plurality of machines for issuing five unit tickets, a plurality of machines for issuing ten unit tickets, a plurality of machines for issuing fifty unit tickets, and a plurality of machines for issuing one hundred unit tickets; a first collector having a main and a reflex chain; means responsive to an operation of a two unit ticket machine for operating the collector to establish a connection from the two unit acceptance relay to the operated ticket machine through either of the two collector chains; a second collector having a main and a reflex chain; means responsive to an operation of a five unit ticket machine for operating the second collector to establish a connection from the five unit acceptance relay over the main chain of that collector to the operated ticket machine; and means responsive to an operation of a ticket machine in the group consisting of the ten, the fifty, and the one hundred unit machines for operating the second collector to extend a circuit from the acceptance relay corresponding to the operated ticket machine, over the reflex chain of that collector to the operated ticket machine.

2. In a totalisator system; an adding machine; a first group of ticket issuing machines; a second group of ticket issuing machines; a collector; a plurality of start relays in said collector, one for each ticket machine in the first group and a corresponding ticket machine in the second group; a collector relay associated with each one of said start relays; means responsive to the simultaneous operation of a plurality of said start relays through simultaneous operation of the associated ticket machines for operating the collector relays associated with the operated start relays one at a time in preferred sequence, to establish connections between the adding machine and operated ticket machines in the first group of ticket machines one at a time in sequence, and then re-operating said collector relays in the same preferred sequence to establish connections between the adding machine and operated ticket machines in the second group one at a time in the same sequence.

3. In a totalisator system; an adding machine; a first group of ticket issuing machines; a second group of ticket issuing machines; a collector; means in said collector responsive to the operation of the ticket machines of the first group for establishing a connection between said adding machine and the operated ticket machines in said group, one at a time in sequence; means in each ticket machine for breaking its connection to the adding machine; a reflex relay in said collector; means for operating said relay after the connection to the last operated ticket machine in said first group has been broken, said means in said collector then being re-operated to establish a connection between said adding machine and the operated ticket machines in the second group one at a time in sequence; reset means in said collector operated, after the connection to the last operated ticket machine in the second group has been broken, to restore said reflex relay to normal and thereby render said collector again accessible to operated ticket machines in the first group.

4. In a totalisaor system; an adding machine; a first group of ticket issuing machines; a second group of ticket issuing machines; a collector; a start relay in said collector for each ticket machine in the first group and also for a corresponding ticket machine in the second group; a collector relay associated with each start relay; means in each ticket machine for operating the associated start relay; means responsive to a simultaneous operation of a plurality of said start relays for operating the associated collector relays one at a time in preferred order; means responsive to the operation of each collector relay for momentarily establishing a connection between the adding machine and the ticket machine in the first group associated with that collector relay; a reflex relay; means for operating said reflex relay after a connection to the last operated ticket machine in the first group has been made and broken; means responsive to the operation of said reflex relay for re-operating the collector relays one at a time in said preferred order to momentarily establish a connection between the total adding machine and the operated ticket machines in the second group; a reset relay in said collector; means for operating said reset relay after the connection to the last ticket machine in the second group has been made and broken; and means responsive to an operation of said reset relay for restoring said reflex relay thereby to render said collector relays available to the ticket machines in said first group.

5. In a totalisator system; a collector; a plurality of ticket machines arranged in two groups; a plurality of start relays, one common to each ticket machine in the first of said groups and to a corresponding ticket machine in the second of said groups; a collector relay for each start relay; an adding machine; means in each ticket machine for operating the associated start relay; a chain circuit in the collector energized by the operation of a start relay and extended to the associated collector relay to operate that relay; a circuit mens extending from said adding machine to a main chain of normally closed contacts on said collector relays, thence through normally open contacts on the operated collector relay to the associated ticket machine in the first group to connect that ticket machine to the adding machine; means in the adding machine for de-energizing said first mentioned chain circuit thereby to stop the collector; means in the ticket machine for opening said circuit to the adding machine thereby to restore it and to re-energize said first mentioned chain circuit; a reflex relay in said collector; reflex control relay means in said collector operated upon said re-energization of said chain circuit to operate said reflex relay; contacts on said reflex relay opened by its operation to disconnect said circuit means from said main chain; a reflex chain of normally closed contacts in said collector; contacts on said reflex relay closed by its operation to connect said circuit means to said reflex chain; and contacts on the operated collector relay closed thereby to extend said reflex chain to the associated ticket machine in the second group thereby to connect it to said adding machine.

6. In a totalisator system; win and place pool equipment each comprising a total adding machine, a plurality of runner adding machines, and collector means; a plurality of ticket machines each arranged to issue tickets of a predetermined value, which value is to be registered part in each of said pools; an acceptance relay and a plurality of runner selecting keys in each ticket machine; a combine unit containing runner selecting relays, value selecting relays, and acceptance relays for each pool; a combine collector; means responsive to the operation of a ticket machine key for operating the combine collector to establish a circuit extending in series through the selected runner selecting relay, the ticket machine acceptance relay and the value selecting relay corresponding to the value of the tickets the operated ticket machine is arranged to issue, said runner selecting and value selecting relays operating over said circuit; means responsive to the operation of said runner and value selecting relays for closing circuits to the selected runner adding machines in both pools, which circuits extend through corresponding acceptance relays in the combine unit to the total adding machines in both pools thereby to effect registrations in both pools, said combine acceptance relays operating upon completion of said registrations; an acknowledging circuit in said combine unit closed by the operation of both pool acceptance relays therein to operate the ticket machine acceptance relay; and contacts on said acceptance relays through which the circuit of the relay extends, which contacts are opened by the operation of the relays to restore the equipment to normal.

7. A totalisator system as specified in claim 6, in which the operated ticket machine is arranged to issue four unit value tickets, of which value two units are registered in each of said pools.

8. A totalisator system as specified in claim 6, in which the operated ticket machine is arranged to issue ten unit value tickets, of which value five units are registered in each of said pools.

9. A totalisator system as specified in claim 6, in which the circuit over which the runner and value selecting relays are operated includes a resistance and in which the combine acknowledging circuit closed by the operation of both pool acceptance relays in the combine unit shortcircuits that resistance to increase the current flowing through the ticket machine acceptance relay thereby to operate that relay.

10. A totalisator system as specified in claim 6, in which the circuits from the combine unit to the total adding machine in each pool is extended thereto by the collector means in that pool.

11. In a totalisator system; win and place pool equipment each comprising: total and individual runner adding machines and collector means; ticket machines each arranged to issue tickets of a predetermined value, which value is to be registered part in each of said pools; an acceptance relay and a plurality of runner selecting keys in each ticket machine; a combine collector; a combine unit containing runner selecting relays, value selecting relays, and an acceptance relay for each of said pools; means responsive to the operation of a ticket machine key for operating said combine collector to establish a circuit through the runner selecting relay corresponding to the operated key, the acceptance relay in that ticket machine and the value selecting relay corresponding to the value of the ticket that ticket machine is arranged to issue, said runner and value selecting relays operating over said circuit; operation of said relays establishing a circuit from the selected runner adding machine in the win pool, through a win pool acceptance relay in the combine unit, through the win pool collector means to the win total adding machine to operate said adding machines and then operate said acceptance relay; operation of said runner and value selecting relays also establishing a circuit from the selected runner adding machine in the place pool, a place pool acceptance relay in the combine unit, through the place pool collector means to the place pool total adding machine to operate said adding machines and then operate said place pool acceptance relay; an acknowledging circuit in said combine unit closed by the operation of the win and place pool acceptance relays therein to operate the ticket machine acceptance relay; and normally closed contacts on each acceptance relay included in the circuit over which that relay is operated and opened by the operation of that relay to restore the associated equipment to normal.

12. In a totalisator system; win, place and show pool equipment each comprising a total adding machine, a plurality of runner adding machines, and collector means; a plurality of ticket machines each arranged to issue tickets of a predetermined value, which value is to be registered part in each of said three pools; an acceptance relay and a plurality of runner selecting keys in each of said ticket machines; a combine unit containing runner selecting relays, value selecting relays and acceptance relays for each pool; a combine collector; means responsive to the operation of a ticket machine key for operating said combine collector to establish a circuit extending in series through the selected runner selecting relay, the acceptance relay in the ticket machine containing the operated key and the value selecting relay corresponding to the predetermined value of tickets issued by that machine, said runner selecting and value relays operating over said circuit; means responsive to the operation of the runner selecting and value relays for closing circuits to the selected runner adding machines in each pool, which circuits extend through corresponding pool acceptance relays in the combine unit to the total adding machines in each pool, thereby to effect registrations in the three pools, said combine unit acceptance relays operating upon completion of said registrations; an acknowledging circuit in said combine unit closed by the operation of the three pool acceptance relays therein to operate the ticket machine acceptance relay; and contacts on said acceptance relays through which the circuit of the relay extends, which contacts are opened by the operation of the relays to restore the equipment to normal.

13. A totalisator system as specified in claim 12, in which the operated ticket machine is arranged to issue six unit value tickets, of which value two units are registered in each of the three pools.

14. A totalisator system as specified in claim 12, in which the operated ticket machine is arranged to issue fifteen unit value tickets, of which value five units are registered in each of the three pools.

15. A totalisator system as specified in claim 12, in which the circuit over which the runner and value selecting relays are operated includes a resistance and in which the combine unit acknowledging circuit closed by the operation of the three pool acceptance relays in the combine short-circuits that resistance to increase the current flowing through the ticket machine acceptance relay thereby to operate that relay.

16. A totalisator system as specified in claim 12, in which the circuits from the combine unit to the total adding machine in each of the three pools is extended thereto by the collector means in that pool.

17. In a totalisator system; win, place and show pool equipment each comprising: total and individual runner adding machines and collector means; ticket machines each arranged to issue tickets of a predetermined value which is to be registered part in each of said pools; an acceptance relay and a plurality of runner selecting keys in each ticket machine; a combine collector; a combine unit containing runner selecting relays, value selecting relays, and an acceptance relay for each of said pools; means responsive to the operation of a ticket machine key for operating said combine collector to establish a circuit through the runner selecting relay corresponding to the operated key, the acceptance relay in that ticket machine, and the value selecting relay corresponding to the value of the ticket that ticket machine is arranged to issue, said runner and value selecting relays operating over said circuit; operation of said relays establishing a circuit from the selected runner adding machine in the win pool through a win pool acceptance relay in the combine unit, through the win pool collector means to the win pool total adding machine to operate said adding machines and then operate said acceptance relay; operation of said runner and value selecting relays also establishing a circuit from the selected runner adding machine in the place pool, a place pool acceptance relay in the combine unit, through the place pool collector means to the place pool total adding machine to operate said adding machines and then operate said acceptance relay; operation of said runner and value selecting relays also establishing a circuit from the selected runner adding machine in the show pool, through a show pool acceptance relay in the combine unit, through the show pool collector means to the show pool total adding machine to operate said adding machines and then operate said acceptance relay; an acknowledging circuit in said combine unit closed by the operation of said three acceptance relays therein to operate said ticket machine acceptance relay; and normally closed contacts on each acceptance relays included in the circuit over which that relay is operated and opened by the operation of that relay to restore the associated equipment to normal.

References Cited in the file of this patent

UNITED STATES PATENTS

| | | |
|---|---|---|
| 2,066,698 | Simpson | Jan. 5, 1937 |
| 2,121,164 | Robinson | Jan. 21, 1938 |
| 2,179,698 | Levy et al. | Nov. 14, 1939 |
| 2,182,875 | Levy | Dec. 12, 1939 |
| 2,195,267 | Bush | Mar. 26, 1940 |
| 2,432,324 | May | Dec. 9, 1947 |
| 2,479,681 | Handley | Aug. 23, 1949 |
| 2,563,041 | Johnston | Aug. 7, 1951 |
| 2,605,967 | Stone | Aug. 5, 1952 |
| 2,680,561 | Handley | June 8, 1954 |